US010824596B2

(12) United States Patent
Mueller et al.

(10) Patent No.: US 10,824,596 B2
(45) Date of Patent: *Nov. 3, 2020

(54) ADAPTIVE DICTIONARY COMPRESSION/DECOMPRESSION FOR COLUMN-STORE DATABASES

(71) Applicant: SAP SE, Walldorf (DE)

(72) Inventors: Ingo Mueller, Heidelberg (DE); Cornelius Ratsch, Heidelberg (DE); Peter Sanders, Karlsruhe (DE); Franz Faerber, Walldorf (DE)

(73) Assignee: SAP SE, Walldorf (DE)

( * ) Notice: Subject to any disclaimer, the term of this patent is extended or adjusted under 35 U.S.C. 154(b) by 123 days.

This patent is subject to a terminal disclaimer.

(21) Appl. No.: 16/255,622

(22) Filed: Jan. 23, 2019

(65) Prior Publication Data

US 2019/0155788 A1    May 23, 2019

Related U.S. Application Data

(63) Continuation of application No. 14/139,669, filed on Dec. 23, 2013, now Pat. No. 10,235,377.

(51) Int. Cl.
*G06F 16/17* (2019.01)
*G06F 16/22* (2019.01)

(52) U.S. Cl.
CPC ............ *G06F 16/17* (2019.01); *G06F 16/221* (2019.01)

(58) Field of Classification Search
None
See application file for complete search history.

(56) References Cited

U.S. PATENT DOCUMENTS

| 4,864,497 A | 9/1989 | Lowry et al. |
| 5,253,325 A | 10/1993 | Clark |

(Continued)

OTHER PUBLICATIONS

Abadi et al., "Column-Stores vs. Row-Stores: How Different Are They Really?" *Proc. of the 2008 ACM SIGMOD Int'l Conf. on Management of Data*, 14 pp. (Jun. 2008).

(Continued)

*Primary Examiner* — Christopher J Raab
(74) *Attorney, Agent, or Firm* — Klarquist Sparkman, LLP

(57) ABSTRACT

Innovations for adaptive compression and decompression for dictionaries of a column-store database can reduce the amount of memory used for columns of the database, allowing a system to keep column data in memory for more columns, while delays for access operations remain acceptable. For example, dictionary compression variants use different compression techniques and implementation options. Some dictionary compression variants provide more aggressive compression (reduced memory consumption) but result in slower run-time performance. Other dictionary compression variants provide less aggressive compression (higher memory consumption) but support faster run-time performance. As another example, a compression manager can automatically select a dictionary compression variant for a given column in a column-store database. For different dictionary compression variants, the compression manager predicts run-time performance and compressed dictionary size, given the values of the column, and selects one of the dictionary compression variants.

20 Claims, 7 Drawing Sheets

(56) References Cited

U.S. PATENT DOCUMENTS

| | | |
|---|---|---|
| 5,577,249 A | 11/1996 | Califano |
| 5,870,036 A | 2/1999 | Franaszek |
| 6,597,812 B1 | 7/2003 | Fallon et al. |
| 8,255,398 B2 | 8/2012 | Bhattacharjee |
| 8,688,718 B1 | 4/2014 | Dubey et al. |
| 8,706,727 B2 | 4/2014 | Yang et al. |
| 2008/0294863 A1 | 11/2008 | Faerber et al. |
| 2008/0307181 A1 | 12/2008 | Kuszmaul |
| 2009/0063465 A1 | 3/2009 | Ferragina et al. |
| 2010/0030796 A1 | 2/2010 | Netz |
| 2010/0223237 A1* | 9/2010 | Mishra ............... G06F 9/30178 707/693 |
| 2010/0328115 A1 | 12/2010 | Binnig et al. |
| 2011/0078153 A1 | 3/2011 | Motoki |
| 2011/0173164 A1 | 7/2011 | Bendel et al. |
| 2011/0219020 A1 | 9/2011 | Oks et al. |
| 2011/0252063 A1* | 10/2011 | Isaacson ............... G06F 16/435 707/780 |
| 2012/0221528 A1 | 8/2012 | Renkes et al. |
| 2013/0018889 A1 | 1/2013 | Jagmohan et al. |
| 2013/0060780 A1 | 3/2013 | Lahiri et al. |
| 2013/0103655 A1* | 4/2013 | Fanghaenel ......... G06F 16/2272 707/693 |
| 2013/0198152 A1 | 8/2013 | McGhee et al. |
| 2013/0262486 A1 | 10/2013 | O'Dell et al. |
| 2013/0325874 A1 | 12/2013 | Weyerhaeuser et al. |
| 2014/0037210 A1* | 2/2014 | Depalov .................... G06T 9/00 382/176 |
| 2014/0070966 A1 | 3/2014 | Fablet et al. |
| 2014/0214779 A1 | 7/2014 | Francis |
| 2014/0279961 A1 | 9/2014 | Schreter et al. |
| 2014/0304275 A1 | 10/2014 | Baskett et al. |
| 2015/0106382 A1 | 4/2015 | Liu et al. |
| 2015/0142818 A1 | 5/2015 | Florendo et al. |
| 2015/0142819 A1 | 5/2015 | Florendo et al. |
| 2015/0178305 A1 | 6/2015 | Mueller et al. |
| 2016/0070699 A1* | 3/2016 | Depalov ............... H04N 19/90 707/738 |

OTHER PUBLICATIONS

Abadi et al., "Integrating Compression and Execution in Column-oriented Database Systems," *SIGMOD*, pp. 671-682 (Jun. 2006).

Abadi, "Query Execution in Column-Oriented Database Systems," Massachusetts Institute of Technology, Ph.D. Thesis, 148 pp. (Feb. 2008).

Adb-El-Malek et al., "Early Experiences on the Journey Towards Self-* Storage," *IEEE Data Eng. Bull.*, vol. 29, No. 3, pp. 55-62 (2006).

Agrawal et al., "Automated Selection of Materialized Views and Indexes in SQL Databases," *Proc. of the 26th Int'l Conf. on VLDB*, pp. 496-505 (2000).

Arz et al., "LZ-Compressed String Dictionaries," *Data Compression Conf.*, pp. 322-331 (Mar. 2014).

Bhattacharjee et al., Efficient Index Compression in DB2 LUW, *Proc. of the VLDB Endowment*, vol. 2, Issue 2, pp. 1462-1473 (Aug. 2009).

Binnig et al., "Dictionary-based Order-preserving String Compression for Main Memory Column Stores," *SIGMOD*, pp. 283-295 (Jun. 2009).

Boncz et al., "Mil Primitives for Querying a Fragmented World," *The International Journal on Very Large Data Bases*, vol. 8, No. 2, pp. 101-119 (Oct. 1999).

Boncz et al., "MonetDB/X100: Hyper-pipelining Query Execution," *CIDR*, pp. 225-237 (2005).

Brisaboa et al., "Compressed String Dictionaries," *Proc. of the 10th Int'l Conf. on Experimental Algorithms*, vol. 6630, pp. 136-147 (May 2011).

Bruno et al., "An Online Approach to Physical Design Tuning," *Proceedings of the International Conference on Data Engineering*, pp. 826-835 (2007).

Burrows et al., "A Block-sorting Lossless Data Compression Algorithm," Technical Report 124, 24 pp. (May 10, 1994).

Canovas et al., "Practical Compressed Suffix Trees," *9th Int'l Symp. on Experimental Algorithms*, pp. 94-105 (May 2010).

Charikar et al., "The Smallest Grammar Problem," *IEEE Trans. on Information Theory*, vol. 51, No. 7, pp. 2554-2576 (Jul. 2005).

Chaudhuri et al., "An Efficient Cost-Driven Index Selection Tool for Microsoft SQL Server," *Proc. of the 23rd VLDB Conf.*, pp. 146-155 (1997).

Chaudhuri et al., "An Overview of Data Warehousing and OLAP Technology," *ACM SIGMOD Record*, vol. 26, No. 1, pp. 65-74 (Mar. 1997).

Chaudhuri et al., "Self-tuning Database Systems: a Decade of Progress," *Proc. of the 33rd Int'l Conf. on VLDB*, pp. 3-14 (Sep. 2007).

Cormack, "Data Compression on a Database System," *Communications of the ACM*, vol. 28, No. 12, pp. 1336-1342 (Dec. 1985).

Cormen et al., *Introduction to Algorithms*, MIT Press, Third Edition, 1313 pp. (Jul. 2009).

Crochemore et al., "Direct Construction of Compact Directed Acyclic Word Graphs," *Combinatorial Pattern Marching*, vol. 1264, pp. 116-129 (Dec. 1996).

Crochemore et al., "On Compact Directed Acyclic Word Graphs," *Structures in Logic and Computer Science*, vol. 1261 pp. 192-211 (1997).

Dageville et al., "Oracle's Self-Tuning Architecture and Solutions," *IEEE Data Eng. Bull.*, vol. 29, No. 3, pp. 24-31 (2006).

Extended European Search Report dated Jul. 2, 2015, from European Patent Application No. 14003675.7, 12 pp.

Färber et al., "SAP HANA Database—Data Management for Modern Business Applications," *ACM SIGMOD Record*, vol. 40, No. 4, pp. 45-51 (Dec. 2011).

Färber et al., "The SAP HANA Database—an Architecture Overview," *IEEE Data Eng. Bull.*, vol. 35, No. 1, pp. 28-33 (Mar. 2012).

Ferragina et al., "Compressed Representations of Sequences and Full-text Indexes," *AMC Transactions on Algorithms*, vol. 3, No. 2, 21 pp. (May 2007).

Ferragina et al., "Compressed Text Indexes: From Theory to Practice," *Journal of Experimental Algorithmics*, vol. 13, No. 12, 27 pp. (Feb. 2009).

Ferragina et al., "Opportunistic Data Structures with Applications," *41st Annual Symp. on Foundations of Computer Science*, pp. 390-398 (Nov. 2000).

Garcia-Molina et al., "Main Memory Database Systems: an Overview," *IEEE Trans. on Knowledge and Data Engineering*, vol. 4, No. 6, pp. 509-516 (1992).

Goldstein et al., "Compressing Relations and Indexes," *Proc. Int'l Conf. on Data Engineering*, pp. 370-379 (Feb. 1998).

Gonzalez et al., "Compressed Text Indexes with Fast Locate," *Proc. 18th annual symposium on Combinatorial Pattern Matching*, pp. 216-227 (2007).

Grossi et al, "Fast Compressed Tries Through Path Decompositions," *Proc. of the 14th Meeting on Algorithm Engineering & Experiments*, pp. 65-74 (2011).

Huffman, "A Method for the Construction of Minimum-redundancy Codes," *Proc. of the IRE*, vol. 40, No. 9, pp. 1098-1101 (Sep. 1952).

Idreos et al., "Estimating the Compression Fraction of an Index Using Sampling," *IEEE 26th Int'l Conf. on Data Engineering*, pp. 441-444 (Mar. 2010).

Khoshafian et al., "A Query Processing Strategy for the Decomposed Storage Model," *IEEE Proc. of the Third Int'l Conf. on Data Engineering*, pp. 636-643 (Feb. 1987).

Kimura et al., "Compression Aware Physical Database Design," *Proc. Int'l Conf. on Very Large Data Bases*, vol. 4, No. 10, pp. 657-668 (Jul. 2011).

Knuth, *The Art of Computer Programming, vol. 3: Sorting and Searching*, Addison Wesley, 140 pp. (2007).

Krüger et al., "Optimizing Write Performance for Read Optimized Databases," *Proc. of the 15th Int'l Conf. on Database Systems for Advanced Applications*, 15 pp. (Apr. 2010).

Larsson et al., "Offline Dictionary-based Compression," *Proc. Data Compression Conf.*, pp. 296-305 (Mar. 1999).

(56) References Cited

OTHER PUBLICATIONS

Lemke, Physische Datenbankoptimierung in hauptspeicherbasierten Column-Store-Systemen, PhD thesis, Technische Universatät Ilmenau, 142 pp. (Mar. 2012).
Lemke et al., "Speeding Up Queries in Column Stores—a Case for Compression," *12th Int'l Conf. on Data Warehousing and Knowledge Discovery*, pp. 117-129 (Aug. 2010).
McCreight, "A Space-economical Suffix Tree Constructions Algorithm," *Journal of the ACM*, vol. 23, No. 2, pp. 262-272 (Apr. 1976).
Moffat et al., "In-place Calculation of Minimum-redundancy Codes," *Proc. of the 4th Int'l Conf. on Algorithms and Data Structures*, pp. 393-402, (Aug. 1995).
Mueller et al., "Adaptive String Dictionary Compression in In-Memory Column-Store Database Systems," *Proc. 17th Int'l Conf. on Extending Database Technology*, 12 pp. (Mar. 2014).
Navarro et al., "Compressed Full-text Indexes," *ACM Computing Surveys*, vol. 39, Issue. 1, No. 2, 79 pp. (Apr. 2007).
Paradies et al., "How to Juggle Columns: An Entropy-Based Approach for Table Compression," *Proc. of the 14th Int'l Database Engineering & Applications Symp.*, pp. 205-215 (Aug. 2010).
Plattner, "A Common Database Approach for OLTP and OLAP Using an In-memory Column Database," *Proc. of the 35th SIGMOD Int'l Conf. on Management of Data*, 7 pp. (Jun. 2009).
Plattner, "Compression," Hasso Plattner Institute, slideshow, 5 pp. (document not dated).
Rauhe, "HANA In-Memory Computing Engine—Concepts and Architecture Overview," 40 pp. (Oct. 2011).
Ray et al., "Database Compression: A Performance Enhancement Tool," *Proc. of 7th Int'l Conf. on Management of Data*, 20 pp. (1995).
Russo et al., "Fully Compressed Suffix Trees," *ACM Trans. on Algorithms*, vol. 7, No. 4, pp. 1-34 (Sep. 2011).
Sadakane, "Compressed Suffix Trees with Full Functionality," *Theory of Computing Systems*, vol. 41, No. 4, pp. 589-607 (Feb. 2007).
Salomon, *Data Compression: The Complete Reference*, Chapter 3, "Dictionary Methods," pp. 171-261 (Dec. 2006).
SAP, "SAP HANA Modeling Guide," SAP HANA Platform SPS 08, Document Version: 1.1, 170 pp. (Aug. 2014).
Sattler et al., "QUIET: Continuous Query-driven Index Tuning," *Proc. of the 29th Int'l Conf. on VLDB*, vol. 29, pp. 1129-1132 (Sep. 2003).
Schnaitter et al., "COLT: Continuous On-line Database Tuning," *Proc. of the ACM SIGMOD Int'l Conf. on Management of Data*, pp. 793-795 (Jun. 2006).
Stonebraker et al., "C-store: A Column-Oriented DBMS," *VLDB*, pp. 553-564 (2005).
Tallman, "ASE 16: Data & Index Compression," SAP Community Network, 4 pp. (Aug. 2014).
Transaction Processing Performance Council, TPC-C Benchmark, http://www.tpc.org/tpcc/default.asp, Apr. 2013. 2 pages.
Transaction Processing Performance Council, TPC-H Benchmark, http://www.tpc.org/tpch/default.asp, Apr. 2013. 2 pages.
Weiner, "Linear Pattern Matching Algorithms," *Proc. of the 14th Annual Symp. on Switching and Automata Theory*, pp. 1-11 (1973).
Welch, "A Technique for High-performance Data Compression," *IEEE Computer*, vol. 17, No. 6, pp. 8-19 (1984).
Westmann et al., "The Implementation and Performance of Compressed Databases," *ACM SIGMOD Record*, vol. 29, Issue 3, pp. 55-67 (Sep. 2000).
Willhalm et al., "SIMD-Scan: Ultra Fast In-Memory Table Scan Using On-chip Vector Processing Units," *Proc. of the VLDB Endowment*, vol. 2, Issue 1, pp. 385-394 (Aug. 2009).
Willhalm et al., "Vectorizing Database Column Scans with Complex Predicates," *Fourth International Workshop on Accelerating Data Management Systems*, 12 pp. (Aug. 2013).
Williams et al., "Compressing Integers for Fast File Access," *Comput. J.*, vol. 42, No. 3, pp. 193-201 (1999).
Witten et al., "Arithmetic Coding for Data Compression," *Communications of the ACM*, vol. 30, No. 6, pp. 520-540 (Jun. 1987).
Witten et al., *Managing Gigabytes: Compressing and Indexing Documents and Images*, Morgan Kaufmann, San Francisco, CA, 551 pp. (1999).
Zhang, "Best Practice: Using DB2 Compression Feature in SAP Environment," SAP Community Network, 37 pp. (Jul. 2010).
Ziv et al., "A Universal Algorithm for Sequential Data Compression," *IEEE Transactions on Information Theory*, vol. 23, No. 3, pp. 337-343 (May 1977).
Zukowski et al., "Super-Scalar RAM-CPU Cache Compression," *IEEE Proc. of the 22nd Int'l Conf. on Data Engineering*, 12 pp. (Apr. 2006).

\* cited by examiner

| employee number | department | office | citizenship |
|---|---|---|---|
| 1001 | corporate | San Jose, CA, USA | USA |
| 1002 | corporate | San Jose, CA, USA | Germany |
| 1004 | R&D | Dresden, Germany | Germany |
| 1005 | sales | San Jose, CA, USA | Canada |
| 1008 | products | San Jose, CA, USA | USA |
| 1010 | sales | San Jose, CA, USA | Mexico |
| 1011 | products | Beijing, China | Germany |
| 1012 | R&D | San Jose, CA, USA | India |
| 1018 | corporate | Dresden, Germany | UK |
| 1020 | products | Beijing, China | China |
| 1021 | legal | San Jose, CA, USA | USA |
| 1025 | HR | San Jose, CA, USA | USA |
| 1027 | R&D | Dresden, Germany | Korea |
| 1029 | products | San Jose, CA, USA | Mexico |
| ... | ... | ... | ... |

Figure 2 dictionary (200) for department

| value ID | distinct value |
|---|---|
| 1 | corporate |
| 2 | HR |
| 3 | legal |
| 4 | products |
| 5 | R&D |
| 6 | sales | dictionary (202) for office

| value ID | distinct value |
|---|---|
| 1 | Beijing, China |
| 2 | Dresden, Germany |
| 3 | San Jose, CA, USA | dictionary (204) for citizenship

| value ID | distinct value |
|---|---|
| 1 | Canada |
| 2 | China |
| 3 | Germany |
| 4 | India |
| 5 | Korea |
| 6 | Mexico |
| 7 | UK |
| 8 | USA |

| employee number | department | office | citizenship |
|---|---|---|---|
| 1 | 1 | 3 | 8 |
| 2 | 1 | 3 | 3 |
| 3 | 5 | 2 | 3 |
| 4 | 6 | 3 | 1 |
| 5 | 4 | 3 | 8 |
| 6 | 6 | 3 | 6 |
| 7 | 4 | 1 | 3 |
| 8 | 5 | 3 | 4 |
| 9 | 1 | 2 | 7 |
| 10 | 4 | 1 | 2 |
| 11 | 3 | 3 | 8 |
| 12 | 2 | 3 | 8 |
| 13 | 5 | 2 | 5 |
| 14 | 4 | 3 | 6 |
| ... | ... | ... | ... |

Figure 4 dictionary (400) for last name

| value ID | distinct value |
|---|---|
| ... | ... |
| 2496 | Santos |
| 2497 | Sargent |
| 2498 | Sato |
| 2499 | Saunders |
| 2500 | Sawyer |
| 2501 | Schaeffer |
| 2502 | Schaffer |
| 2503 | Schiller |
| 2504 | Schilling |
| 2505 | Schmidt |
| 2506 | Schneider |
| 2507 | Schreiber |
| 2508 | Schroeder |
| 2509 | Schultz |
| 2510 | Schumaker |
| 2511 | Schwartz |
| 2512 | Schweitzer |
| 2513 | Scott |
| 2514 | Segal |
| 2515 | Segura |
| 2516 | Serrano |
| 2517 | Sexton |
| 2518 | Shannon |
| 2519 | Shapiro |
| 2520 | Sharp |
| 2521 | Sharpe |
| ... | ... | software 580 implementing one or more innovations for adaptive dictionary compression/decompression for in-memory column-store databases

ADAPTIVE DICTIONARY COMPRESSION/DECOMPRESSION FOR COLUMN-STORE DATABASES

CROSS REFERENCE TO RELATED APPLICATIONS

This application is a continuation of U.S. patent application Ser. No. 14/139,669, filed Dec. 23, 2013, which is hereby incorporated by reference.

FIELD

A compression manager controls compression and decompression of dictionaries (e.g., string dictionaries) for column-store databases.

BACKGROUND

A database is an organized collection of data. A database typically organizes data to correspond to how the data is logically arranged. This facilitates operations on the data, for example, looking up values in a database, adding data to the database, sorting the data in the database, or summarizing relevant data in the database. A database management system mediates interactions between a database, users and applications in order to organize, create, update, capture, analyze and otherwise manage the data in the database.

The terms online transaction processing ("OLTP") and online analysis processing ("OLAP") indicate two different usage patterns for databases. OLTP includes the day-to-day tasks of business, such as order processing for products of a business. Often, OLTP involves simple, repetitive transactions to add data, update data, or remove data a database. In contrast, OLAP includes analysis of data over a longer period of time in order to support informed decisions, for example, analysis of which of the products are most profitable. Usually, an OLAP system uses data generated in an OLTP system.

Because OLTP systems run fundamental business tasks such as order processing, OLTP systems tend to focus on the performance of operations such as adding data, removing data and updating data. OLTP systems emphasize preserving data integrity in multi-user environments and ensuring that data are up-to-date. Transactions in an OLTP system are expected to be simple and have short run times, and transaction throughput is an important metric.

In contrast, because OLAP systems provide tools for analysis and optimization of business processes, OLAP systems tend to focus on the performance of operations such as reading and sorting data. Data for the OLAP system is updated periodically (e.g., from an OLTP system) but not changed in typical OLAP operations. Queries in an OLAP system (e.g., to aggregate or join data) may be complex and long running, and query throughput is an important metric.

Historically, most database management systems have implemented record-oriented storage of data in a database. A database that uses record-oriented storage is a row-store database. In a row-store database, the values of a tuple (set of elements) in a database relation are stored contiguously in storage or memory. For example, FIG. 1 shows a view (100) of a table of an example database that includes records for employees (in rows), where each record includes values for employee number, department, office and citizenship. In a row-store database, values for employee number, department, office and citizenship are stored contiguously for the first employee, then values for employee number, department, office and citizenship are stored contiguously for the second employee, and so on. (1001 corporate San Jose, Calif., USA USA |1002 corporate San Jose, Calif., USA Germany | . . . ) Record-oriented storage is efficient when inserting a new record or selecting a whole record, since all values of the record can be written or read at once. For this reason, row-store databases are often used in OLTP systems. Operations that involve aggregating values in a single column are not efficient, however, since most values are skipped for records in the row-oriented storage.

Therefore, some database management systems have implemented column-oriented storage of data in a database. A database that uses column-oriented storage is a column-store database. A column-store database can include one or more tables. In a column-store database, a table of data is partitioned into separate columns, and the values of each column are stored contiguously in storage or memory. The columns of a table typically have the same length (number of records, or rows). For example, for the values shown in FIG. 1, in a column-store database, values for employee number are stored contiguously for all records (rows), then values for department are stored contiguously for all records, and so on. (1001 1002 1004 . . . |corporate corporate R&D . . . | . . . ) The columns are independent, in that a column does not necessarily have to be written directly after the column that precedes it in the table. Column-oriented storage is efficient when aggregating values in a single column. Column-oriented storage also facilitates compression. A sequence of values in one column can usually be compressed more efficiently than a sequence of values for a record. On the other hand, inserting a new record or selecting a whole record in a column-store database involves writing or reading values in multiple columns, which can be inefficient.

To speed up operations that read data from a column-store database, a database management system can keep column data in main memory. An in-memory database keeps data in main memory, with backups of the data stored in storage (e.g., disk storage). For example, an in-memory column-store database keeps column data in memory. In contrast, a disk-resident database keeps data in storage, and parts of the data are cached in main memory.

Within a column in a database table, values may repeat. In many cases, the number of distinct values in a column is smaller than the number of rows in the table. To reduce how much memory is used to store column data, a database management system can represent the set of distinct values in a dictionary, which is an auxiliary data structure that maps value identifiers ("value IDs") to distinct values. The value IDs are usually integers. If the distinct values are strings, the dictionary is called a string dictionary.

FIG. 2 shows example dictionaries (200, 202, 204) for the database of FIG. 1. The dictionary (200) for the department column maps value IDs to corresponding distinct values within the department column. The dictionary (202) for the office column maps value IDs to distinct values within the office column, and the dictionary (204) for the citizenship column maps value IDS to distinct values within the citizenship column. The values in the employee number column can also be represented in a dictionary (not shown). Typically, the distinct values in a dictionary are sorted in ascending order.

In the database, values in a column are replaced with value IDs that represent those values. This process is sometimes called domain encoding or domain coding. FIG. 3 shows a view (300) of the table of the example database of FIG. 1, with values replaced with value IDs from dictionaries. A column vector is a sequence of value IDs for a column. Thus, a column of values is replaced with a column vector (of value IDs) and a dictionary that maps value IDs to distinct values. If the initial values of a column consume more space than the column vector and dictionary for the column, using the column vector and dictionary achieves compression. This happens, for example, when the average value of the column is larger than an integer (value ID) and the number of distinct values is much smaller than the number of rows. In particular, this is a common scenario for columns of string values.

In some cases, a column vector includes many repeated value IDs. Redundancy among the value IDs of a column vector can be further exploited to reduce how much memory is used to store the column vector.

Domain encoding has several other advantages. For example, searching for the occurrence of a value in a column can be performed using integer comparisons on the value IDs of the column vector. Integer comparisons are usually faster than string comparisons. As another example, when the dictionary is sorted in ascending order, range queries can be performed efficiently. Value IDs for the end points of the range can be identified, then rows with value IDs in the range can be returned. On the other hand, some access operations are slower on compressed data for a column, compared to access operations on uncompressed data, since they involve another layer of lookup operations using a dictionary.

In general, a string dictionary implements a locate(str) function and an extract(id) function. Given a string str that is contained in the dictionary, the function locate(str) returns a value ID id, which is unique for the string str. Given a value ID id, the function extract(id) returns the corresponding string in the dictionary. In the example of FIGS. 1-3, a call to locate(R&D) in the dictionary for department returns the value 5. A call to extract(2) for this dictionary returns the string HR.

In a column-store database, the values (or value IDs) of a column are stored contiguously. For an in-memory column-store database, if the column data consumes too much space, some column data will not fit into main memory. Some types of database management system can unload column data for individual columns of a column-store database to address this problem. If a query attempts to access a value in an unloaded column, the data for the column is reloaded from disk storage. In addition to causing delay, this may force the system to unload column data for a different column. In particular, string data can consume a large amount of memory when stored in an uncompressed form. Even when it is compressed using domain coding with string dictionaries, the distinct values in the string dictionary can consume a large proportion of the available memory for the database. For example, FIG. 4 shows part of a dictionary (400) with several thousand distinct values for last name. Even if using domain coding can reduce overall memory consumption due to repeated names, the size of the dictionary (400) is significant.

SUMMARY

In summary, the detailed description presents innovations for adaptive compression and decompression for dictionaries of a column-store database. Using the innovations, a compression manager can compress dictionaries to reduce the amount of memory used for columns of a column-store database. In example implementations, the innovations help a database management system keep column data in memory for more columns, while delays for access operations on compressed data stay at an acceptable level.

According to one aspect of the innovations described herein, a compression manager selects one of multiple available dictionary compression variants to apply to a dictionary for a column of a table in a column-store database (e.g., an in-memory column-store database).

The multiple available dictionary compression variants can include variants that differ in terms of the compression technique that is used. For example, the dictionary compression variants can include: (1) one or more variants that use Huffman coding or Hu-Tucker coding, (2) one or more variants that use front coding, (3) one or more variants that use bit compression, (4) one or more variants that use N-gram compression, according to which N-tuples are replaced with x-bit codes, (5) one or more variants that use Re-Pair compression and/or (6) one or more variants that use column-wise bit compression. Or, the multiple available dictionary compression variants can include variants that differ in teens of how the dictionary is implemented. For example, the dictionary compression variants can include: (1) one or more variants that use an array of string data and an array of pointers to locations in the array of string data, (2) one or more variants that use an array of fixed-length blocks, (3) one or more variants that use data structures for front coding and/or (4) one or more variants that use data structures for column-wise bit compression.

The selection of a dictionary compression variant can be based on evaluation of the multiple available dictionary compression variants by the compression manager. For example, the compression manager evaluates at least some of the variants in terms of compressed dictionary size and run-time performance. The compression manager can use a tuning parameter that sets a preference between compressed dictionary size and run-time performance, adjusting the tuning parameter based at least in part on amount of free memory in a computing system for the database. Or, as another example, the compression manager evaluates at least some of the variants using compression models for the variants, where a given compression model predicts size of a compressed dictionary. Or, as another example, the compression manager evaluates at least some of the variants using characteristics of the respective dictionary compression variants (e.g., for a given variant, a compression model and one or more run time values), characteristics of the column (e.g., an expected number of extract operations until a next merge operation (to incorporate changes to the column of the table in the column-store database, which may involve reconstructing the dictionary to account for the changes), an expected number of locate operations until the next merge operation, a size of a column vector for the column, a merge frequency and values of the column) and characteristics of the system for the database (e.g., an amount of free physical memory and an amount of physical memory currently consumed by the database).

The compression manager can use any of several selection strategies to select a dictionary compression variant. For example, the compression manager determines which of the variants results in smallest compressed dictionary size. Or, as another example, the compression manager determines which of the variants results in shortest delays in run-time performance. Or, as another example, the compression manager determines which of the variants results in an acceptable trade-off between compressed dictionary size and delays in run-time performance. The compressed dictionary size can account for size of the column, as a weighted compressed dictionary size, or just account for the size of the compressed dictionary. The run-time performance can account for frequency of access.

The compression manager applies the selected dictionary compression variant to the dictionary. The compression manager can repeat the selecting and the applying for each of one or more other columns of the column-store database.

The innovations for adapting compression and decompression of dictionaries in a column-store database can be implemented as part of a method, as part of a computing system adapted to perform the method or as part of tangible computer-readable media storing computer-executable instructions for causing a computing system to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 1 is a chart illustrating values of a table of an example database.

FIG. 2 is a set of charts illustrating dictionaries used in domain coding for the example database of FIG. 1 as a column-store database.

FIG. 3 is a chart illustrating values of the example database of FIG. 1 after domain coding as a column-store database.

FIG. 4 is a chart illustrating part of a larger string dictionary used in domain coding for a column-store database.

DETAILED DESCRIPTION

The detailed description presents innovations for adaptive compression and decompression for dictionaries of a column-store database. Using the innovations, a compression manager can compress dictionaries to reduce the amount of memory used for columns of a column-store database. In example implementations, the innovations help a database management system keep column data in memory for more columns, while delays for access operations on compressed data stay at an acceptable level.

One aspect of the innovations described herein is dictionary compression variants that use different compression techniques and implementation options. These dictionary compression variants can reduce memory consumption for columns of string values, while still providing good run-time performance for access operations and other operations. Different dictionary compression variants have different strengths and weaknesses. For example, some dictionary compression variants provide more aggressive compression (reduced memory consumption) but tend to result in slower run-time performance. Other dictionary compression variants provide less aggressive compression (higher memory consumption) but tend to support faster run-time performance. In many cases, the relative performance of dictionary compression variants depends on the values of the column that are compressed (and, hence, the dictionary content).

According to another aspect of the innovations described herein, a compression manager automatically selects a dictionary compression variant for a given column of values in a column-store database. In example implementations, performance of the dictionary compression variants is mapped to two dimensions—run-time performance and compressed dictionary size—and the compression manager predicts values of both dimensions, given the values of a column. More generally, the selection of a dictionary compression variant can be based on the access frequency of the column, the size of the compressed dictionary, the number of updates, the memory pressure of the database system and/or other factors. The memory pressure of the database system, depending on the amount of free memory and the number of unloaded columns, can be determined by the compression manager and used to determine a trade-off between run-time performance and compressed dictionary size.

Various alternatives to the examples described herein are possible. For example, some of the methods described herein can be altered by changing the ordering of the acts described, or by splitting, repeating, or omitting certain acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 5:
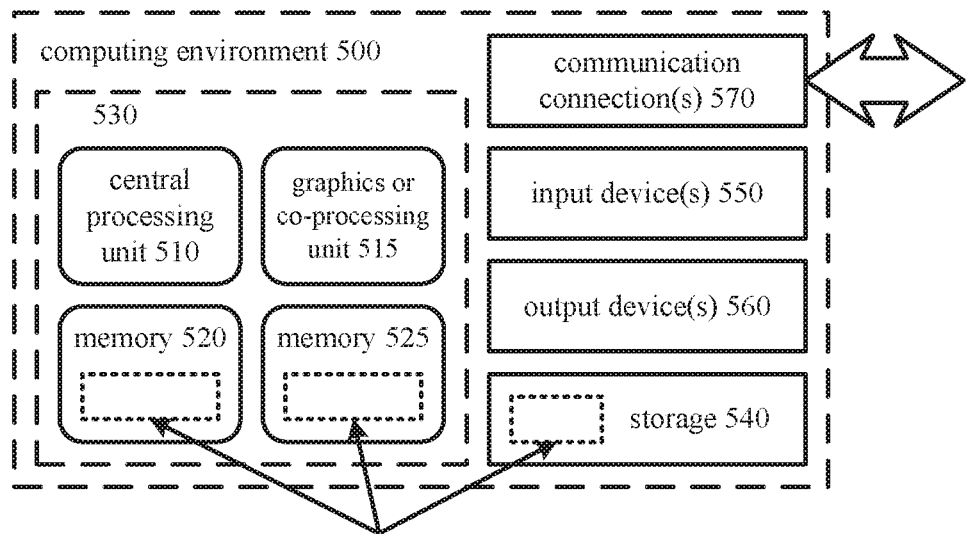
FIG. 5 is a diagram illustrating a generalized computing system in which some embodiments described herein can be implemented.

FIG. 5 illustrates a generalized example of a suitable computing system (500) in which several of the described innovations may be implemented. The computing system (500) is not intended to suggest any limitation as to scope of use or functionality, as the innovations may be implemented in diverse general-purpose or special-purpose computing systems.

With reference to FIG. 5, the computing system (500) includes one or more processing units (510, 515) and memory (520, 525). The processing units (510, 515) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 5 shows a central processing unit (510) as well as a graphics processing unit or co-processing unit (515). The tangible memory (520, 525) may be volatile memory (e.g., registers, cache, RAM), non-volatile memory (e.g., ROM, EEPROM, flash memory, etc.), or some combination of the two, accessible by the processing unit(s). The memory (520, 525) stores software (580) implementing one or more innovations for adapting compression and decompression of dictionaries in an in-memory column-store database, in the form of computer-executable instructions suitable for execution by the processing unit(s).

A computing system may have additional features. For example, the computing system (500) includes storage (540), one or more input devices (550), one or more output devices (560), and one or more communication connections (570). An interconnection mechanism (not shown) such as a bus, controller, or network interconnects the components of the computing system (500). Typically, operating system software (not shown) provides an operating environment for other software executing in the computing system (500), and coordinates activities of the components of the computing system (500).

The tangible storage (540) (also called computer-readable storage) may be removable or non-removable, and includes magnetic disks, magnetic tapes or cassettes, CD-ROMs, DVDs, or any other medium which can be used to store information and which can be accessed within the computing system (500). The storage (540) stores instructions for the software (580) implementing one or more innovations for adapting compression and decompression of dictionaries in an in-memory column-store database.

The input device(s) (550) may be a touch input device such as a keyboard, mouse, pen, or trackball, a voice input device, touchscreen for receiving gesture input, a scanning device, or another device that provides input to the computing system (500). The output device(s) (560) may be a display (e.g., touchscreen), printer, speaker, CD-writer, or another device that provides output from the computing system (500).

The communication connection(s) (570) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (500), computer-readable media include memory (520, 525), storage (540), and combinations of any of the above.

The innovations can be described in the general context of computer-executable instructions (also called machine-readable instructions), such as those included in program modules (also called computer program product), being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit specially designed or configured to implement any of the disclosed methods (e.g., an ASIC such as an ASIC digital signal process unit, a graphics processing unit, or a programmable logic device such as a field programmable gate array).

For the sake of presentation, the detailed description uses terms like "determine," "provide" and "use" to describe computer operations in a computing system. These terms are high-level abstractions for operations performed by a computer, and should not be confused with acts performed by a human being. The actual computer operations corresponding to these terms vary depending on implementation.

II. Example Architectures for Adaptive Dictionary Compression and Decompression.

Figure 6:
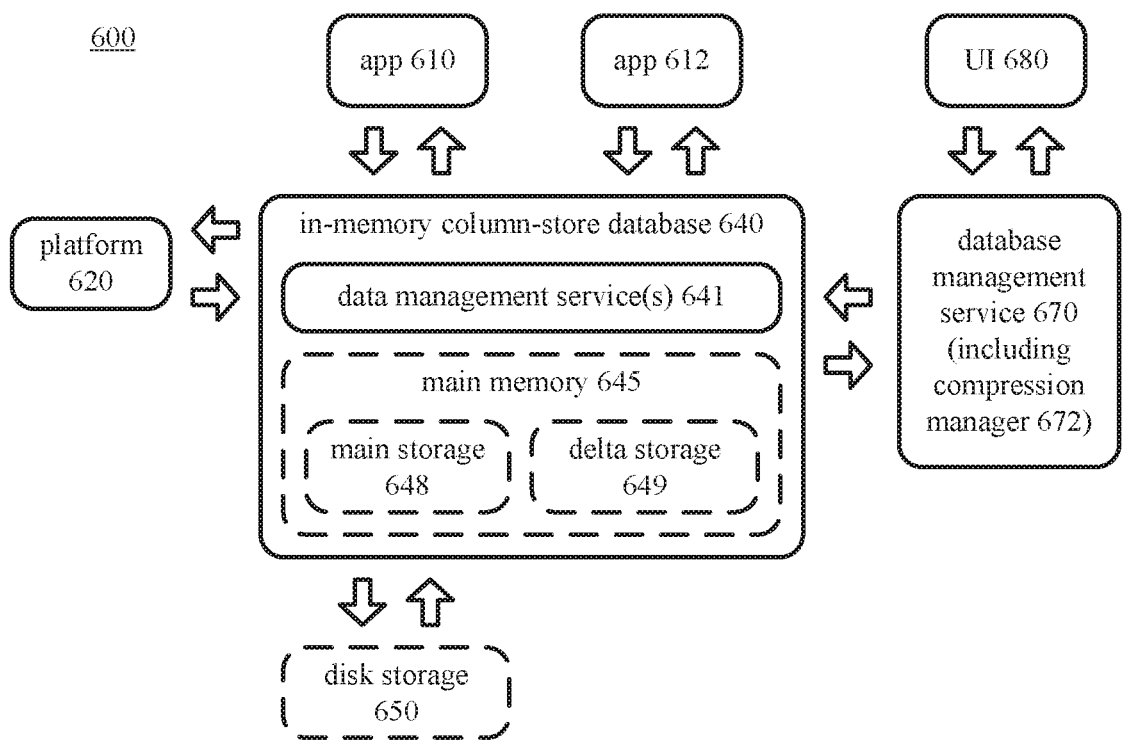
FIG. 6 is a diagram illustrating an example architecture for adaptive compression and decompression of dictionaries for an in-memory column-store database.

FIG. 6 shows an example architecture (600) for adaptive compression and decompression of dictionaries for an in-memory column-store database (640). The architecture (600) can support OLTP and/or OLAP processes. In addition to the in-memory column-store database (640) and supporting services, the architecture can include a row-store database and supporting services (not shown).

The applications (610, 612) interact with the in-memory column-store database (640). For example, an application can provide analytical services, transaction processing services, reporting services, dashboard services, or other services to a user. The applications (610, 612) interact with the database (640) using structured queries or other expressions. Although FIG. 6 shows two applications, the architecture can include more or fewer applications. The architecture (600) also includes one or more platforms (620), which can be a data warehousing service that exposes OLAP services to a user or other application.

The database management service (670) includes a compression manager (672). As detailed below, the compression manager (672) evaluates dictionary compression variants for columns of the database (640), selects among the dictionary compression variants and applies the selected dictionary compression variants to values of column data. Although FIG. 6 shows the compression manager (672) outside the database (640), alternatively, the compression manager (672) is integrated into the database (640), e.g., as part of the database management service(s) (641). The user interface (680) mediates interactions between the database management service (670), including the compression manager (672), and a user or application, for example, to configure the compression manager (672) or set user preferences for compression operations.

Within the in-memory column-store database (640), the data management service(s) (641) manage transactions with the main storage (648) (also called read-optimized store) and the delta storage (649) (also called write-optimized store), which are in system memory (645). The data management service(s) (641) can provide a calculation/planning engine, administration services, modeling services, real-time replication services, data integration services and/or other services.

The main storage (648) supports fast read access to column data of the database (640) in system memory (645) for OLAP queries or OLTP queries. A read operation accesses both the main storage (648) and delta storage (649), which includes any recently changed data that has not yet been incorporated into the main storage (648). The column data in the main storage (648) is backed up to disk storage (650). The disk storage (650) stores column data even when the column data cannot fit in the main storage (648), but accessing column data in the disk storage (650) is much slower than accessing column data in the main storage (648) in system memory (645).

The main storage (648) can store column data in compressed form. After domain encoding, value IDs within a column vector are compressed. The value IDs can be compressed using prefix encoding, Lempel-Ziv compression, run length encoding, cluster encoding, sparse encoding, indirect encoding, bit vector encoding, a combination of the preceding techniques or another compression technique. The compression technique that is applied to value IDs of a column vector can be selected when the dictionary is constructed or reconstructed (e.g., during a delta merge operation). Also, the dictionaries used in the domain encoding are compressed, as detailed below.

For OLTP queries, the database (640) supports write operations. The write operations are not performed directly on the main storage (648), which is read-only. Instead, the database (640) uses delta storage (649) for write operations. The delta storage (649) resides in system memory (645), without backup to the disk storage (650). The data in the delta storage (649) is typically uncompressed.

The delta storage (649) can be merged with the main storage (648). Such a delta merge operation can happen automatically, if the delta storage (649) exceeds a specified size, or manually. During a delta merge operation, a second delta storage (not shown) is created to support further write accesses. During the delta merge operation, a read operation accesses the main storage (648), delta storage (649) and second delta storage.

III. Example String Dictionaries and Their Properties.

In example implementations, a string dictionary is a read-only data structure that implements a locate(str) function and an extract(id) function. Distinct values in a string dictionary are typically sorted (e.g., in ascending order).

Given a string str that is contained in the dictionary, the function locate(str) returns a value ID id that is unique for the string str. If multiple strings in the dictionary are equal to str (e.g., during a case-insensitive search), the value ID of the first equal string is returned. If a string matching str is not contained in the dictionary, locate(str) returns the value ID of the first string that is greater than str. Thus, the locate function corresponds to a lower bound search. If the string str is not found in the dictionary, the search returns the index where the searched string would be located in the dictionary.

Given a value ID id, the function extract(id) return the corresponding string that is associated with the value ID in the dictionary. An access to a string value in a column-store database involves an extract(id) operation in a string dictionary. Because they are common, a compression manager generally favors fast extract operations. An extract operation can be a random extract operation (that, one arbitrary element in a dictionary is accessed) or sequential extract operation (that is, when multiple consecutive elements in a dictionary are accessed sequentially).

On the other hand, a locate(str) operation is performed, for example, when a query involves a comparison of a string value in a column-store database against another string value. Because locate operations are less frequent, the performance of locate operations tends to be less important than the performance of extract operations.

Especially for columns with many distinct values, a compression rate dictionary is important, in order for dictionaries to remain in main memory. For a list of strings $str_1$, $str_2, \ldots str_n$ in a string dictionary d, the compression rate comp(d) of the dictionary d is given by:

$$comp(d) = \frac{\sum_{i=1}^{n} |str_i| - |d|}{\sum_{i=1}^{n} |str_i|},$$

where $|d|$ represents the compressed dictionary size. For example, the highest compression rate is 1 if the dictionary has a size of 0 bytes, and the compression rate is 0 if the compressed dictionary has the same size as the strings. The compression rate is negative if the compressed dictionary is larger than the uncompressed string data.

In example implementations, dictionaries are read-only. Updates to a database table can cause changes to the dictionaries for columns, however. To handle updates, the compression manager can track changes in an additional data structure (e.g., in delta storage) and merge the changes with the dictionaries (e.g., in main storage) from time-to-time. A merge operation involves reconstructing a dictionary, integrating the changes. When selecting dictionary compression variants, the compression manager can consider construction time for a dictionary using different dictionary compression variants.

String dictionaries can store human-readable strings in ASCII, Unicode or another format, or store arbitrary binary data. Typically, string dictionaries store human-readable strings of type CHAR, VARCHAR or NVARCHAR.

The distinct values represented in a string dictionary can be sorted (e.g., in ascending order) to facilitate certain types of access operations. For example, dictionaries containing human-readable strings are sorted case-insensitively, then sorted case-sensitively (lower case characters before upper case characters) for any strings that cannot be distinguished using a case-insensitive comparison. The resulting sort order for the human-readable strings may differ from binary sort order. When searching for the occurrence of a string in the dictionary, a case-insensitive search and/or case-sensitive search can be performed, depending on how the dictionary is sorted.

Alternatively, a dictionary contains raw binary data of BINARY type, VARBINARY type or another type. The distinct values represented in a dictionary can be sorted in raw binary sort order. For purposes of processing as a string, a byte of the raw binary data can be treated as a CHAR, and a series of bits of raw binary data can be treated as a sequence of CHARs.

A string dictionary can also be used as an index structure, for example, an index structure that includes values for an external key column. The values of the external key column are concatenated values that include primary key attributes for a table. Query operations can be then performed using value IDs for concatenated search terms and the external key column. Or, a string dictionary can be used for other concatenated attributes (e.g., for a foreign key relation).

In common use case scenarios, most dictionaries are small, but the few large dictionaries consume a disproportionate amount of memory. In particular, in many cases, a few very large string dictionaries consume most of the memory used by the database system. Compression of these large string dictionaries can significantly reduce memory consumption.

IV. Example Dictionary Compression Variants.

Dictionary compression variants can differ in terms of the compression techniques used and/or the data structures used to implement the variants. One goal of dictionary compression is reduction in dictionary size. Another goal, often in tension with the first goal, is to provide fast performance for extract operations and locate operations.

A. Compression Techniques.

Compression techniques include statistical approaches and dictionary-based approaches. Statistical approaches exploit the frequency of occurrence of symbols in input by encoding frequent symbols using shorter codes than infrequent symbols. A dictionary-based approach maintains a dictionary of frequent symbol sequences and replaces those sequences with codes that are shorter than the replaced symbols.

Compression techniques can be adaptive or non-adaptive. An adaptive compression technique tracks statistical information or dictionary usage during compression (e.g., tracking probability distributions of symbols during compression, symbol-after-symbol), and can adjust the codes used to represent symbols. During decompression, statistical information or dictionary usage is similarly tracked, and codes are similarly adjusted. A non-adaptive compression technique uses fixed statistical information or a fixed dictionary to compress symbols. The fixed information or fixed dictionary can be independent of the actual content to be encoded (e.g., based on probability distributions observed during training). Or, the fixed information or fixed dictionary can be based on the actual content to be encoded (e.g., as determined by scanning over the data before compression to determine probability distributions for that data).

For compression of dictionaries for a column-store database, adaptive compression techniques tend complicate the process of extracting information. Adaptive compression techniques typically decompress all compressed data up to the location of desired data (in order to use the correct codes, based on observed probability distributions up to the point of compression). This is efficient if all of the data is used. In common operations for a column-store database, however, individual strings are extracted at selected locations from a string dictionary. Therefore, in example implementations, dictionary compression variants use non-adaptive compression.

1. Front Coding.

Front coding works on sorted dictionaries. Consecutive strings in a string dictionary often share a common prefix. In the dictionary (400) of FIG. 4, for example, many of the consecutive strings have a common prefix of 2, 3, 4 or more characters. If multiple consecutive strings share a common prefix, the dictionary stores the common prefix once. Other instances of the prefix refer to the stored common prefix. The remaining suffixes can be further compressed by a statistical or dictionary-based compression approach. Front coding tends to support fast extract operations from a string dictionary.

In example implementations of front coding, a compression manager partitions a dictionary into blocks of string values. Each of the blocks has b string values, except the final block in some cases. Within a block, the compression manager stores the first string completely (possibly with compression using a statistical or dictionary-based approach). For each following string $str_i$ in the same block, the compression manager replaces the common prefix shared with the preceding string $str_{i-1}$ with the length of the common prefix. The compression manager stores the remaining suffix, possibly with compression using a statistical or dictionary-based approach. For example, suppose the dictionary (400) of FIG. 4 is partitioned into blocks of 4 strings. One block includes the values Schaeffer, Schaffer, Schiller and Schilling. Using front coding, the compression manager stores the string values:

Schaeffer
4 ffer
3 iller
6 ing

The block of four strings starts with a complete string. In compressed form, each following string starts with a number specifying how many initial characters it shares with its predecessor. The complete first string and suffixes can be further compressed.

To extract a string with value ID i, the compression manager divides the value ID i by the block size b to determine the block index of the block that includes the string (that is, $b_{index}$=i div b). Within this block, the compression manager locates the string at position p=i mod b. Working from the start of the block, the compression manager reconstructs the prefix of the string at position p. The compression manager adds the suffix of the string at position p to the reconstructed prefix.

For example, suppose the operation extract(2503) is requested for the dictionary (400) of FIG. 4, and the block size is 4. The block index $b_{index}$ is 2503 div 4=625. The position p of the string within the block is 2503 mod 4=3. The prefix for the $3^{rd}$ string in the block uses the first 3 characters from the $2^{nd}$ string in the block, which is represented as 4 ffer. This string has a prefix that uses the first 4 characters from the $1^{st}$ string in the block, which is stored as Schaeffer. Using decompression, as needed, for preceding string values, the compression manager recovers the prefix Sch for the $3^{rd}$ string. The compression manager also recovers the suffix iller for the $3^{rd}$ string (using decompression, if needed) and combines it with the prefix to reconstruct the extracted string Schiller.

To locate a string str in the dictionary, the compression manager performs a binary search on the first strings of the respective blocks, in order to locate the block that includes the string str. If needed (string does not match a first string of a block), the compression manager performs a linear scan of this block to find the value ID i of the string str within the block, if present.

For example, suppose the operation locate(Schumaker) is requested for the dictionary (400) of FIG. 4, and the block size is 4. A binary search using the first strings of the respective blocks ( . . . , Sargent, Schaeffer, Schmidt, Schultz, Scott . . . ) indicates the requested string is between Schultz and Scott, which places the requested string in the block whose first string is Schultz. A linear scan of this block finds the string Schumaker at value ID 2510, which is returned. In the linear scan, the first string need not be checked, since it was checked in the binary search. Also, since the block is scanned starting from its first string, the common prefix is easily maintained during extraction. In this example, the compression manager recovers the string Schultz in the binary search. For the $2^{nd}$ string, the compression manager recovers the prefix Schu and combines it with the suffix maker, which yields the matching string, and the value ID 2510 is returned.

If a dictionary contains human-readable strings, and a case-insensitive search is performed, multiple strings might be considered to be equal to the searched string (in the binary search or linear scan). Several concurrent blocks may be scanned to identify the earliest matching string.

2. Huffman Compression

In Huffman coding, frequent symbols are replaced with shorter codes, and infrequent symbols are replaced with longer codes, so as to reduce average code length. For string compression, Huffman coding can operate on single characters, with common characters such as e and s being replaced with shorter codes, and longer characters such as q and z being replaced with longer codes.

For string compression in which Huffman codes represent individual characters, a binary tree defines the codes associated with characters of the string dictionary. The leaf nodes of the binary tree represent the characters, and the binary decisions starting from the root node and leading to the respective leaf nodes indicate the binary digits of the codes. For example, in a very small tree that includes the characters a, b, c and d, the Huffman codes can be a=00, b=010, c=011 and d=1.

For 8-bit characters, the compression manager can implement a dictionary for Huffman coding as an array of length 256, where each entry is a tuple (code, length) that includes the code value and length of the code. During compression, the compression manager replaces a character with the corresponding code value from the dictionary. Since code values have variable length, the number of characters cannot be directly calculated from the length of the compressed data, and the last code value in the compressed data does not necessarily fill out an entire byte of a byte array. In example implementations, a termination byte can indicate the end of an ASCII or Unicode string. Or, more generally, a termination sequence can indicate the end of compressed data for arbitrary raw binary data, where the termination sequence is not mapped to a character but instead indicates the end of compressed data.

To decode Huffman-compressed data, the compression manager can reconstruct characters by traversing the compressed data, bit-by-bit, and replacing code values with characters using the Huffman code table used during encoding. Or, the compression manager can reconstruct Huffman-compressed data using multi-level Huffman code tables.

3. Hu-Tucker Compression.

Hu-Tucker codes are Huffman codes that have an additional restriction with respect to ordering of code values. Given an ordered sequence of characters $c_1<c_2<\ldots<c_n$, the corresponding Hu-Tucker codes have the same binary order $h(c_1)<h(c_2)<\ldots<h(c_n)$. If uncompressed strings are binary sorted, the compressed strings from Hu-Tucker compression are binary sorted too.

Using Hu-Tucker codes can hurt compression efficiency (compared to using Huffman codes). There are performance advantages, however, when the binary order of compressed strings is the same as the initial order of the uncompressed strings. For example, for strings sorted in ascending order, instead of comparing a search string to decompressed string values in a binary search, the compression manager can compress the search string and directly compare the compressed search string to compressed string values for the dictionary.

Hu-Tucker codes can be created in a way similar to Huffman codes, with additional constraints to control the binary ordering of the Hu-Tucker codes.

4. Bit Compression.

For bit compression, each character occurring in a string dictionary is represented by a number of bits $x_{bits}$ that is constant for all of the characters. The number of bits $x_{bits}$ relates to the number of distinct characters $n_{characters}$ as follows. $x_{bits}=\lceil \log_2(n_{characters}) \rceil$, where $\lceil r \rceil$ returns the next integer higher than a number r. For example, if 54 characters are used in the dictionary, the number of bits is $\lceil \log_2(54) \rceil = 6$.

In terms of compression rate, bit compression can be efficient if the strings in the dictionary consist of only a small set of characters. Also, if the bit compression codes representing characters are ordered according to the order of the characters, and if the uncompressed strings are binary sorted, the initial sort order is preserved. The compression manager can perform a binary search directly on the compressed strings to locate a string in the dictionary.

The compression manager can implement a mapping of characters to corresponding bit compression code values as an array, where each entry includes the code value (but not the length, since all code values have the same length $x_{bits}$). During compression, the compression manager replaces a character with the corresponding code value from the dictionary. To decode bit-compressed data, the compression manager can reconstruct characters by traversing the compressed data, in sets of $x_{bits}$, and replacing code values with characters using the bit compression code table used during encoding.

5. N-Gram Compression.

In N-gram compression, the compression manager replaces a sequence of multiple characters with a code value. Frequent combinations of N characters (where $A \geq 2$) are mapped to code values of constant length x. For characters having y bits (where x>y), the most common $2^x-2^y$ combinations of N characters are mapped to x-bit code values. The remaining x-bit code values directly represent the $2^y$ possible characters, respectively. For example, for 12-bit code values that represent 2-grams of 8-bit characters, $2^{12}-2^8=3840$ of the 12-bit code values represent the most common pairs of characters. The remaining 256 12-bit code values represent individual 8-bit character values. Common values of N are 2 and 3, and common values of x are 12 and 16.

To compress a string, the compression manager sequentially scans the string using a sliding window of size N. If the window includes a frequent N-gram, the x-bit code for the N-gram replaces the N-gram, and the window is moved forward by N characters. If the window does not include a frequent N-gram (one represented with an x-bit code value), an x-bit code for the first character replaces the first character, and the window is moved forward by one character. An array with length of $2^x$ can map x-bit code values to corresponding N-grams or character values.

To decompress a string, using an array that maps code values to N-grams or character values, the compression manager replaces a code value with the corresponding N-gram of characters or single character. The compression manager can process one or more x-bit codes as an integer number of bytes, using hard-coded bit masks and bit shifts when code boundaries do not overlap byte boundaries. For example, the compression manager processes two 12-bit codes as three bytes, or the compression manager processes a single 16-bit code as two bytes. Due to the fixed code length, extract operations can be performed very efficiently.

Locate operations for dictionaries compressed using N-gram compression are less efficient than other approaches because the sort order of strings is not preserved in the compressed data. Because the codes in the compressed data can represent either single characters or character sequences of length N, a byte-wise comparison of two compressed strings does not necessarily correspond to comparing the initial strings byte-wise. Thus, the compression manager decompresses the encoded byte sequences in order to compare the uncompressed strings.

6. Re-Pair Compression.

Re-Pair compression is a dictionary-based, non-adaptive compression technique. The compression manager replaces a frequent pair of symbols (initially, characters) occurring in string data with a new symbol. The compression manager replaces pairs of symbols until there is no more pair occurring at least two times. For example, if the pair of characters ab occurs multiple times, the pair is replaced with a symbol $sym_1$. If the symbol $sym_1$ occurs repeatedly before the character d, the pair $sym_1 d$ is replaced with another symbol $sym_2$. This continues until no more pairs of symbols exist that occur more than one time. The creation of the compression rules for Re-Pair compression can happen concurrently with compression.

Re-Pair compression can lead to a large number of rules, including some rules that cover symbol combinations that rarely occur. In some implementations, the compression manager limits the number of rules, which limits complexity and the space used to store rules. For example, the number of rules is limited to $2^{12}$ or $2^{16}$, such that rules can be indexed with 12-bit symbols or 16-bit symbols.

During decompression, the compression manager expands symbol values (compressed according to the Re-Pair rules) into characters or other symbols, which are in turn expanded. Decompression can use a multi-stage approach, in which the compression manager expands a symbol into its immediate constituent symbols and/or characters. Or, decompression can use a single-stage approach, in which the compression manager expands a symbol into however many characters the symbol represents. In the second approach, the mapping of symbols to characters consumes more space but is faster, compared to the first approach.

7. Column-Wise Bit Compression.

If a string dictionary includes only strings of equal length, the compression manager can use column-wise bit compression. Suppose each string in a set of strings $str_1, \ldots, str_{count}$ has a length l. Each string $str_i$ in the set is a sequence characters $str_i[1], \ldots str_i[l]$. The compression manager partitions the set of strings column-wise into l columns of height count. The first column includes the first character of each of the strings, the second column includes the second character of each of the strings, and so on.

Each of the columns of characters can be bit compressed. That is, for a given column, the compression manager represents its characters with fixed-length codes of a length ($x_{bits}$) that is sufficient to represent the possible character values ($n_{characters}$) in the column. For a given column, a bit compression map, which can be implemented as an array, maps code values to corresponding character values. The compression manager compresses a string by concatenating the bit sequence for each of its characters, using one of the codes for the appropriate column. Each of the c strings, when compressed, has the same number of bits.

Column-wise bit compression is especially useful if some of the columns contain only a few different characters. This might be the case, for example, across a range of ascending numbers that always begin with same digits (e.g., the values of the employee number column in the example of FIG. 1).

To reduce the number of characters in the bit compression map for a column, the dictionary can be partitioned into blocks of strings (e.g., blocks of 128 strings). Inside one of these blocks, it is more likely that a column includes a small number of different characters.

In example implementations, to improve performance, the compression manager can store the first string (reference string) of each block in uncompressed form. If a column contains the same character for each string, a bit compression map is not used for that column. The absence of a bit compression map for the column indicates all characters in the column are the same, and the characters can be skipped (zero bits) in the compressed strings. To decode a string of a block, the compression manager copies the reference string for the block, and replaces characters that may differ from the reference string (after decompressing values for those characters).

For example, if the compression manager compresses a dictionary for the employee number column of FIG. 1 using column-wise bit-wise compression, with a block size of 16 strings, the reference string is 1001. The first two columns have constant values (1 for the first column, and 0 for the second column). For the third column, a bit compression map maps 2-bit codes to the respective values {0, 1, 2, 3}. For the fourth column, a bit compression map maps 3-bit codes to the respective values {0, 1, 2, 4, 5, 7, 8, 9}. The second string can be represented with a 2-bit code for its third character (0) and a 3-bit code for its fourth character (2). To reconstruct the second string, the compression manager copies the reference string 1001 and swaps in the third and fourth characters (after they are decompressed).

Also, when reference strings are used for blocks, the compression manager can search for a string in the dictionary by a fast binary search on the reference strings for the blocks, followed by a binary search on the strings of the block. As an additional improvement, bit compression maps can be shared between columns of a block and/or between blocks in the string dictionary. Block size can be 256 strings, 512 strings or some other number of strings.

8. Other Compression Techniques.

Alternatively, the compression manager uses a dictionary compression variant that incorporates another compression technique. For example, the dictionary compression variant uses a Lempel-Ziv approach (e.g., Lempel-Liv-Welch), run length encoding, arithmetic coding or a Burrows-Wheeler transformation.

B. Dictionary Implementations.

Dictionary compression variants can use various data structures when implementing a dictionary or set of rules for a compression technique or combination of compression techniques.

1. Array Variants.

For many of the compression techniques, the distinct values of strings in a dictionary can be stored completely in an array. Typically, using an array leads to fast access operations.

Array with No Compression.

For a small dictionary, it can be useful to skip compression of string values, since the reduction in dictionary size is not significant, considering the overhead of data structures used for compression. Uncompressed string data values are stored consecutively in an array ("data array"), and a second array maintains pointers to the string data in the data array. The length of a string $str_i$ can be reconstructed by subtracting its pointer from the pointer to the next string $str_{i+1}$. To retrieve a string in this dictionary given a value ID (extract operation), the appropriate pointer in the pointer array is accessed, and the string data at the indicated location of the data array is read. To locate a string in the dictionary, for sorted string data, a binary search is performed, where each comparison uses an access to the pointer array and sequential read access to the data array.

Fixed-Length Array.

Or, a data array with fixed-length slots for the respective strings can be used. The pointer array is not needed. The strings are assumed to have the same length, such that the offset to a string in the data array can be determined from the value ID of the string, resulting in fast access operations.

The length of a string str can no longer be determined by subtracting its pointer from the pointer to the next string $str_{i+1}$. And, the string $str_i$ may occupy less than all of a fixed-length slot of the data array. Therefore, the length of a string is encoded along with the data value for the string. If $l_{max}$ is the length of the longest string (in bytes), and $l_{len}$ is the number of bytes used to indicate the length of a given string, for the whole dictionary of count strings, count× $(l_{max}+l_{len})$ bytes are reserved for the data array. For the string $str_i$, the length $|str_i|$ is encoded using the first $l_{len}$ bytes of slot i, beginning at location $(i-1)\times(l_{max}+l_{len})$. The string data for $str_i$ is stored in the following bytes.

For an extract operation, to extract the string with value ID i, for 1≤i≤count, the location $(i-1)\times(l_{max}+l_{len})$ in the data array is calculated. The length from the first $l_{len}$ bytes is determined, then the string is extracted. For a locate operation on sorted string data, a binary search on the data array is performed.

Using a fixed-length array can result in a dictionary much larger than the aggregate length of the strings represented in the dictionary, especially if strength lengths vary much. Even if most string lengths are close to $l_{max}$, overhead of $l_{len}$ bytes per string is added. If all strings have the same length, however, length values can be omitted. In this case, a special indicator can be used for empty strings.

In particular, fixed-length arrays can be effective for small dictionaries.

Array With Bit Compression.

In this variant of array dictionary, the strings in the data array are compressed using bit compression. The character codes with $x_{bits}$ bits are determined by counting the number of distinct characters $n_{characters}$ contained in all strings in the dictionary. The compressed strings are stored consecutively in a byte-aligned fashion in the data array. A pointer array stores pointers to the respective compressed strings.

To extract a string from this dictionary given a value ID i, the pointer array is accessed, then the data array at the indicated location is accessed. The compressed string data is decoded using a bit compression map.

If the uncompressed strings are binary sorted, the compressed strings can be binary sorted too. To locate a string $str_i$ in the dictionary, the search string $str_i$ is compressed, then a binary search on the pointer array is performed while comparing the compressed search string to the compressed strings in the dictionary.

On the other hand, if the string dictionary contains human-readable data and is not binary sorted, a binary search cannot be performed directly using the compressed strings. In this case, the strings of the dictionary are decompressed during the binary search, for comparison against the search string $str_i$.

Array with Hu-Tucker or Huffman Compression.

In this variant of array dictionary, the strings in the data array are compressed using Hu-Tucker compression or Huffman compression. The compressed string data is stored consecutively in a data array. Using Hu-Tucker codes is useful if the uncompressed strings are binary sorted. Otherwise, Huffman codes can be used, leading to slightly better compression efficiency and faster construction times.

Array With N-Gram Compression.

In this variant of array dictionary, the strings in the data array are compressed using N-gram compression. An extract operation is handled as in the case of an array compressed with bit compression, but using a code table that maps code values to N-grams or individual characters. For a locate operation, compressed strings are decompressed for comparison to a search string. (Even if uncompressed strings are binary sorted, N-gram compression does not necessarily preserve binary order.)

Array With Re-Pair Compression.

In this variant of array dictionary, the strings in the data array are compressed using Re-Pair compression. Extract and locate operations are performed as for an array compressed with N-gram compression.

2. Front Coding Variants.

Front coding can be used to compress the amount of string data while avoiding overhead attributable to pointers (as in most array variants).

Inline Front Coding. A dictionary for front coding, in example implementations, is organized by blocks of a pre-defined size b. For inline front coding, information indicating the length of common prefix for a string is stored inline before the suffix for the string. The first string in a block has no common prefix, and its suffix is represented with a suffix length $s_1$ and character data $d_1$ for the suffix. For each other string $str_i$ in the block, the string is represented with a prefix length $p_i$ (indicating the length of prefix shared with the preceding string $str_{i-1}$), a suffix length $s_i$ and character data $d_i$ for the suffix. For a block, these values are stored consecutively in a byte array (e.g., using a simple variable byte representation): $s_1|d_1|p_2|s_2|d_2|p_3|s_3|d_3| \ldots |p_b|s_b|d_b$.

For purposes of an extract operation or locate operation, the offset of a string inside a block (that is, the position in the byte array where the prefix length information $p_i$ is located) is unknown, except for the first string of the block. To determine the location of a string i for i≥2, strings from string 1 through string i−1 of the block are scanned, to calculate the offset for string i by summing up suffix length values.

Block Header-Based Front Coding.

For block header-based front coding, the prefix length information and suffix length information for a block are extracted and written at the beginning (block header portion) of the block, followed by character data for the suffixes of strings. $s_1|p_2|s_2|p_3|s_3| \ldots |p_b|s_b|d_1|d_2|d_3| \ldots |d_b|$. The position of a string in a block can be determined by scanning the block header. To calculate the offset of the suffix of string $str_i$ in a block, the values from $p_2$ through $p_{i-1}$ and from $s_1$ through $s_{i-1}$ of the block header are scanned.

To extract string $str_i$ from the block, the prefix of string $str_i$ from the i−1 previous strings is collected. In some cases, the string $str_i$ has a common prefix with the first string of the block, and all suffixes $d_{i-1}, \ldots, d_1$ are traversed to determine the shared prefix.

Block Header-Based Front Coding with Difference to First. In this dictionary compression variant, to avoid traversing so many suffixes, the common prefix length of any string $str_i$ is computed relative to the first string in the block, as opposed to the preceding string $str_{i-1}$. Compression efficiency is typically not as good (due to decreased average length of the common prefix for strings that are further apart in sorted order), but to extract a string $str_i$ from a block, only the string itself and the first string in the block are considered.

Block Header-Based Front Coding with Bit Compression.

In this dictionary compression variant, block header-based front coding is adapted to use bit compression of the stored string suffix data. Data layout is the same as block header-based front coding, except that suffix data $d_i$ is compressed using bit compression. Since bit compression preserves the sort order of raw data strings, the extract and locate operations do not change, except that the extract operation decompresses the resulting string, and the locate operation compresses the query string. If the dictionary contains human-readable strings (not necessarily in binary order), the locate operation decompresses strings during the binary search.

Block Header-Based Front Coding with Hu-Tucker or Huffman Compression.

This dictionary compression variant is similar to the last one, except that string suffix data is compressed using Hu-Tucker compression if the uncompressed strings are binary sorted. Otherwise (uncompressed strings are not binary sorted), Huffman compression is used.

Block Header-Based Front Coding with N-Grain Compression.

Similarly, this front coding variant uses N-gram compression to compress stored suffix data. During a locate operation, the compressed suffixes are decompressed while searching, even if the uncompressed strings are binary sorted.

Block Header-Based Front Coding with Re-Pair Compression.

In this dictionary compression variant, Re-Pair compression is used to compress string suffix data. Again, suffixes are decompressed during a locate operation.

3. Column-Wise Bit Compression Variants.

If strings have equal length, column-wise bit compression can be used, as described above.

If strings have variable length, column-wise bit compression with an exception map can be used. The exception map contains the strings that have a length differing from the most frequent string length in the dictionary. The keys of the exception map are the value IDs of the strings.

During construction of the dictionary, the most frequent string length over all strings in the dictionary is determined. This string length is used to encode all strings with column-wise bit compression, as described above. Strings shorter than the most frequent string length are padded with zeros. Strings longer than the string length are cut. The strings of lengths different than the most frequent string length are inserted into the exception map, with their value IDs as keys.

To extract a string from the dictionary, a value ID is searched for in the exception map. If a string is mapped to the value ID, the string is returned. Otherwise, a block index is calculated by dividing the value ID by the block size, copying the reference string for the block and replacing the characters in non-constant columns by their actual values (after decompression of those values).

For a locate operation, a search starts in the exception map. If the string is not found in the exception map, the dictionary is searched using a binary search on the reference strings to find a target block, then a binary search inside the target block.

4. Other Dictionary Compression Variants.

Alternatively, another implementation or different data structures for a dictionary compression variant are used. For example, the dictionary compression variant uses hashing to map strings to index values (value IDs), compressed text self-indexes, a prefix tree or trie, a suffix tree, a compressed suffix tree, a directed acyclic word graph or another implementation/data structure.

5. Example Implementations.

In example implementations, a compression manager evaluates the following dictionary compression variants: (1) uncompressed array; (2) array with bit compression, (3) with Flu-Tucker compression, (4) with N-gram compression using 2-grams or (5) 3-grams, or (6) with Re-Pair compression using 12 bits to store a rule or (7) 16 bits to store a rule; (8) fixed-length array; (9) inline front coding; (10) block header-based front coding by itself, (11) with bit compression, (12) with Hu-Tucker compression, (13) with N-gram compression using 2-grams or (14) 3-grams, (15) with re-pair compression using 12 bits to store a rule or (16) 16 bits to store a rule, or (17) with difference to first; and (18) column-wise bit compression. Alternatively, the compression manager evaluates other and/or different dictionary compression variants.

In most scenarios, no dictionary compression variant dominates both in terms of compressed dictionary size (compression efficiency) and in terms of run-time performance (fast operations). Performance can vary for different types of column data. The following table summarizes advantages and disadvantages of some different dictionary compression variants.

TABLE 1

Characteristics of Different Dictionary Compression Variants.

| Algorithm | Advantages | Disadvantages |
| --- | --- | --- |
| fixed-length array | Very good performance; no overhead for columns with fixed-length strings. | Dictionary can become huge for columns with variable-length strings. |
| front coding | Small performance loss compared to array; good compression rate for binary sorted strings. | Compression rate highly depends on sort order. |
| bit compression | Preserves order if input is binary sorted; good performance. | Usually small compression rate; no compression if more than $2^x - 1$ distinct characters occur. |
| Hu-Tucker/Huffman | Good compression rate; Hu-Tucker preserves order if input is binary sorted. | Poor extract performance. |
| N-gram compression | Good performance; good compression rate for human-readable strings. | Does not preserve order; poor compression rate for random data. |
| Re-Pair compression | Very good compression rate for most input files. | Very poor extract performance, especially if the compression rate is high; does not preserve order. |
| column-wise bit compression | Very good compression rate for fixed-length strings; good performance. | Dictionary can become huge for columns with variable-length strings. |

Due to the different characteristics of dictionary compression variants, which can vary depending on column data that is compressed, and preference for compressed dictionary size versus run-time performance, selection of an appropriate dictionary compression variant can be a complicated process.

For performance that provides a moderate compression rate and moderate run-time performance, the compression manager can select an uncompressed front coding variant. Or, for a higher compression rate, the compression manager can choose a front coding variant that uses Re-Pair compression, but this might lead to significantly worse run-time performance. For fast run-time performance, the compression manager can use a fixed-length array, but this can lead to high memory consumption. For infrequently accessed column data, the compression manager can choose more aggressive compression, and for frequency accessed column data, the compression manager can choose less aggressive compression. Or, the compression manager can select a dictionary compression variant using an approach as described in the next section.

V. Example Evaluation of Dictionary Compression Variants.

A compression manager can automatically select an appropriate dictionary compression variant to use for a column of a column-store database. In general, when selecting a dictionary compression variant, the compression manager considers compressed dictionary size (that is, compression rate) and run-time performance (e.g., the time used for extract and location operations) for the dictionary that is compressed. As part of run-time performance, the compression manager can also consider construction time for the dictionary. In various respects, automatic selection of dictionary compression variants can improve performance.

For example, the selection process can be complicated and involve many factors. In view of the number of possible dictionary compression variants, it can be difficult for a database administrator to keep track of their advantages and disadvantages, and to select an appropriate one for a situation. Selection can be especially difficult for a string column that has a complex pattern of distinct values.

As another example, as column data changes for a column, the dictionary is updated, and the appropriate dictionary compression variant can change. The performance of different dictionary compression variants, especially compression rate but also run-time performance, can depend on the column data that are compressed. With automatic selection, a compression manager can periodically choose an appropriate dictionary compression variant for the column of a column-store database. At the same time, the selection process itself should not perturb overall database performance.

To support automatic selection of dictionary compression variants, a compression manager evaluates compression rate (compressed dictionary size) and run-time performance for the dictionary compression variants.

A. Predicting the Compression Rate.

A compression manager can calculate compression rate (compressed dictionary size) when different dictionary compression variants are applied to a dictionary for a column of a column-store database. That is, for some or all of the dictionary compression variants, the compression manager can compress the strings of the dictionary using the dictionary compression variant and measure the resulting memory consumption (compressed dictionary size). This brute force approach yields accurate measurements of compression rate, but is computationally intensive.

Or, to estimate compression rates for the dictionary compression variants, a compression manager uses compression models to predict compression rates when different dictionary compression variants are applied to a dictionary for a column of a column-store database. For example, a compression model approximates the size of a compressed dictionary using properties of the content of the dictionary. The properties of the content of the dictionary can be calculated for an entire set of strings of the dictionary. Or, to further speed up the modeling process, the compression manager can evaluate a subset of the strings of the dictionary.

TABLE 2

Properties Used to Predict the Compressed Dictionary Size.

| Name | Description |
| --- | --- |
| str_count | number of strings |
| str_sum | number of bytes (sum of string length values) |
| ptr_size | size of pointers in system |
| $cp_p$ | common prefix to predecessor |
| $cp_f$ | common prefix to first string in block |
| $l_{max}$ | maximum string length in the input file |
| $l_{len}$ | number of bytes used to indicate string length |
| $n_b$ | number of blocks |
| $n_{characters}$ | number of distinct characters in the input file |
| $entropy_{char}$ | entropy of character distribution |
| is_fixed | true if all strings are of equal length (ignoring empty string) |
| re_pair | compression rate of Re-Pair algorithm |
| comp_size | compressed dictionary size (uncompressed in some variants) |

1. Compression Models for Array Variants.

The compression manager can estimate compression rate for different array variants using variant-specific compression models.

Uncompressed Array.

In this variant, strings are stored consecutively in uncompressed form in a data array. For each string, a pointer to the string's first character is stored in a pointer array. Additionally, a pointer to the end of the data array is stored in order to calculate the length of the last string. The "compressed" dictionary size (actually, without compression) for is estimated as comp_size=str_sum+(str_count+1)×ptr_size bytes, where the term (str_count+1)×ptr_size represents the contribution of the pointers, Fixed-Length Array.

In this variant, the strings in the dictionary are stored consecutively in uncompressed form in a data array. If the strings all have the same length, the same number of characters is stored for each string. If the dictionary contains strings of different lengths (some strings shorter than $l_{max}$), $l_{len}$ extra bytes are reserved to indicate the length for each string. The "compressed" dictionary size (actually, without compression) is estimated (in bytes) as:

$$comp\_size = \begin{cases} str\_count \times (l_{max}) & \text{if is\_fixed} \\ str\_count \times (l_{max} + l_{len}) & \text{otherwise} \end{cases}.$$

Array With Bit Compression.

Bit compression is based on the number of distinct characters in the data set. Given the number of distinct characters $n_{characters}$, one character is represented by $x_{bits}$ bits, where $x_{bits} = \lceil \log_2(n_{characters}) \rceil$. For 8-bit characters, if $x_{bits}$ is less than 8, a termination sequence indicates the end of a compressed string. Therefore, for each string in the dictionary, an additional character is compressed to indicate the termination sequence.

The compressed dictionary size (in bits) can be roughly estimated as comp_size=str_sum×$x_{bits}$, where str_sum indicates the number of characters in all strings, and each character is coded with $x_{bits}$ bits.

Or, to estimate the compressed dictionary size more precisely, the size (in bits) of compressed data can be estimated as follows, assuming characters are represented with 8 bits.

$$\text{data\_size} = \begin{cases} 1/8 \times x_{bits} \times (\text{str\_sum} + \text{str\_count}) & \text{if } x_{bits} < 8 \\ 1/8 \times x_{bits} \times \text{str\_sum} = \text{str\_sum} & \text{if } x_{bit} = 8 \end{cases}.$$

In this equation, the str_count component represents the contribution of termination sequences for the strings. Since codes do not always fill bytes completely, some amount of wasted bits can be added to the final size. Where average bit waste per string is $$\text{waste} = 1/8 \sum_{i=0}^{7} (-x_{bits} \times i) \bmod 8,$$

the compressed dictionary size (in bytes) is estimated as:

$$\text{comp\_size} = \text{data\_size} + \text{str\_count} \times \frac{\text{waste}}{8} + (\text{str\_count} + 1) \times \text{ptr\_size},$$

where the term (str_count+1)×ptr_size represents the contribution of the pointers.

Array With Hu-Tucker Compression.

In this variant, the strings in the dictionary are compressed using Hu-Tucker compression. The compression manager can obtain the upper bound for the compression rate (that is, a lower bound for the compressed dictionary size) by calculating the entropy of the character distribution in the dictionary. Given the entropy of the character distribution ($\text{entropy}_{char}$) and 8-bit characters, Huffman coding would use at least an average of $\text{entropy}_{char}$ bits per character, and therefore shrink the data size by a factor of at most $\text{entropy}_{char}/8$. The compression rate for Hu-Tucker compression can be no better than the compression rate for Huffman coding. The compression manager estimates the compressed dictionary size bytes) as:

$$\text{comp\_size} = \frac{\text{entropy}_{char}}{8} \times \text{str\_sum} + (\text{str\_count} + 1) \times \text{ptr\_size},$$

where the term (str_count+1)×ptr_size represents the contribution of the pointers.

Array With N-Gram Compression.

In this variant, the strings in the dictionary are compressed using N-gram compression. Suppose n≥2 is the length of the character sequences (n-grams). The n-grams in the dictionary are $g_1, \ldots g_m$, sorted non-increasingly by their frequency of occurrence. $f(g_1) \geq \ldots \geq f(g_m)$ represent the frequencies of occurrence of the n-grams, respectively.

For n-grams represented with x-bit codes, and y-bit characters, the number of codes used for n-grams is num_codes=$2^x-2^y$. The proportion of n-grams that are covered by code values (n-gram coverage) is calculated as:

$$\text{coverage} = \frac{\sum_{i=1}^{num\_codes} f(g_i)}{\sum_{i=1}^{m} f(g_i)}.$$

If the coverage is close to 1 (that is, few n-grams in the dictionary are not represented with x-bit codes), the compression rate is better. If coverage is lower, the compression rate is worse. In particular, if coverage is 1, all of the n-grams are replaced with x-bit codes. In this case, for 12-bit codes (and 8-bit characters), the compression manager estimates the size (in bytes) of compressed string data as data_size=3/2×1/n×str_sum. On the other hand, if coverage is 0, each character is replaced with an x-bit code. In this case, for 12-bit codes, the compression manager estimates the size (in bytes) of compressed string data as data_size=3/2×str_sum. Combining these observations, the size of compressed string data can be represented as follows, for 12-bit codes (and 8-bit characters): data_size=3/2×(1−coverage× (1−1/n)))×str_sum. For 16-bit codes, the factor is 2 instead of 3/2. Alternatively, coverage can be calculated as the proportion of characters represented by n-grams, for all characters in the values for the dictionary.

The overall compressed dictionary size (in bytes) includes an estimate ($\text{bits}_{wasted}$) for bits wasted in the unfilled part of the last byte of compressed data for a string. It also includes a contribution (str_count×ptr_size) for pointers for the strings. The estimate of bits wasted is the average number of bits wasted, considering different counts for the number of x-bit codes per string.

comp_size=data_size+$\text{bit}_{wasted}$+str_count×ptr_size.

Array With Re-Pair Compression.

In this variant, the strings in the dictionary are compressed using Re-Pair compression. The compression rate of Re-Pair compression is difficult to predict. Therefore, the compression manager performs Re-Pair compression on the dictionary to determine the compression rate (re_pair). The compressed dictionary size is estimated as:

comp_size=(1−re_pair)×str_sum+$\text{bit}_{wasted}$+str_count× ptr_size, where $\text{bit}_{wasted}$ estimates bits wasted due to the unfilled part of the last byte of compressed data for a string, and (str_count×ptr_size) represents pointers for the strings.

2. Compression Models for Front Coding Variants.

The compression manager can also estimate compression rate for different front coding variants using variant-specific compression models.

Inline Front Coding.

Front coding uses the common prefix shared with a predecessor string to omit repeated prefixes. Let b be the block size and $$n_b = \left\lceil \frac{\text{str\_count}}{b} \right\rceil$$

be the number of blocks. The compression manager calculates the total amount of common prefixes to predecessor strings ($cp_p$). This value can be subtracted from the initial data size, leading to a suffix size of suffix_size=str_sum−$cp_p$.

For each string (aside from the first string), a prefix length $p_i$ and suffix length $s_i$ are stored. The amount of bits consumed by these two values can vary, generally growing logarithmically with average string length for the dictionary. For simplicity, the compression manager assumes $p_i$ and $s_i$ consume two bytes per string (str_count×2). Additionally, one pointer is stored per block. The compression manager estimates the compressed dictionary size (in bytes) as:

$$\text{comp\_size} = \text{suffix\_size} + \text{str\_count} \times 2 + n_b \times \text{ptr\_size}.$$

Block Header-Based Front Coding.

Block header-based front coding uses a different approach to storing values for prefix length $p_i$ and suffix length but rearrangement of this information does not affect the compressed dictionary size. Block header-based front coding can use a bit vector (vect) that indicates whether values of prefix length $p_i$ and suffix length $s_i$ are stored using a different data type (VByte). The size of this bit vector is the number of blocks divided by the number of bits per byte. The compression manager estimates the compressed dictionary size in bytes) as:

$$\text{comp\_size} = (\text{str\_sum} - cp_p) + \text{str\_count} \times 2 + n_b \times \text{ptr\_size} + \text{vect}.$$

Block Header-Based Front Coding with Difference to First.

The compression model for block header-based front coding with difference to the first string in a block is very similar to the compression model for basic block header-based front coding. The difference is that the compression manager calculates the total amount of common prefixes to the first strings in the respective blocks ($cp_f$). The compression manager estimates the compressed dictionary size (in bytes) as:

$$\text{comp\_size} = (\text{str\_sum} - cp_p) + \text{str\_count} \times 2 + n_b \times \text{ptr\_size} + \text{vect}.$$

Block Header-Based Front Coding with Bit Compression.

In this variant, suffix data is compressed using bit compression. The compression manager can estimate the size (in bits) of compressed data for suffixes as follows, assuming characters are represented with 8 bits.

$$\text{suffix\_size} = \begin{cases} 1/8 \times x_{bits} \times (\text{str\_sum} - cp_p + \text{str\_count}) & \text{if } x_{bits} < 8 \\ 1/8 \times x_{bits} \times (\text{str\_sum} - cp_p) & \text{if } x_{bits} = 8 \end{cases}.$$

In this equation, the str_count component represents the contribution of termination sequences for the strings. Since codes do not always fill bytes completely, some amount of wasted bits can be added to the final size. Where average bit waste per string is $$\text{waste} = 1/8 \sum_{i=0}^{7} (-x_{bits} \times i) \bmod 8,$$

the compressed dictionary size (in bytes) is estimated as:

$$\text{comp\_size} = \text{suffix\_size} + \text{str\_count} \times \frac{\text{waste}}{8} + \text{str\_count} \times 2 + n_b \times \text{ptr\_size} + \text{vect}.$$

Block Header-Based Front Coding with Hu-Tucker Compression.

In this variant, suffix data is compressed using Hu-Tucker compression or Huffman compression. The compression manager estimates an upper bound on the size (in bits) of compressed data for suffixes compressed using Hu-Tucker compression, using the entropy of the character distribution ($\text{entropy}_{char}$). For 8-bit characters, the compression manager estimates the compressed dictionary size (in bytes as:

$$\text{comp\_size} = (\text{str\_sum} - cp_p) \times \frac{\text{entropy}_{char}}{8} + \text{str\_count} \times 2 + n_b \times \text{ptr\_size} + \text{vect}.$$

Block Header-Based Front Coding with N-Gram Compression.

In this variant, suffix data is compressed using N-gram compression. The compression manager estimates the size of compressed data for the suffixes of strings as:

$$\text{suffix\_size} = 3/2 \times (1 - \text{coverage} \times (1 - 1/n)) \times (\text{str\_sum} - cp_p),$$

and the compression manager estimates the compressed dictionary size (in bytes) as:

$$\text{comp\_size} = \text{suffix\_size} + \text{str\_count} \times 2 + n_b \times \text{ptr\_size} + \text{vect}.$$

Block Header-Based Front Coding with Re-Pair Compression.

In this variant, suffix data is compressed using Re-Pair compression. Using the property re_pair, the compression manager estimates the compressed dictionary size (in bytes) as:

$$\text{comp\_size} = (\text{str\_sum} - cp_p) \times (1 - \text{re\_pair}) + \text{str\_count} \times 2 + n_b \times \text{ptr\_size} + \text{vect}.$$

3. Compression Model for Column-Wise Bit Compression.

The compression manager can also estimate the compression rate for column-wise bit compression using a compression model specific to that variant.

The compressed dictionary size for column-wise bit compression is difficult to calculate from generic properties of the string values for a dictionary. Therefore, the compression manager determines the most frequent string length for each block. The compression manager also calculates the number of bits used to represent one string in a block. From this information, the compression manager estimates the compressed sizes of the blocks.

The compression manager approximates the size of the exception map by summarizing the lengths of the different-length strings, and adding the size of an integer per string (for value ID). Also, the compression manager calculates the sizes of the bit compression maps used to translate between bit compressed codes and actual characters in the columns.

4. Alternative Compression Models.

Alternatively, a compression manager uses simpler compression models. For example, the compression manager does not account for memory consumed by pointers, average wasted bits of bytes or bit vectors.

5. Sampling the Set of Strings.

For large dictionaries, it can be time-consuming and computationally intensive to apply the compression models described above for all the strings in the dictionaries. The compression manager can use sampling to further speed up the process of evaluating compression rates using the compression models for dictionary compression variants. For example, the compression manager evaluates the compression models for x % of the strings in a dictionary, where x can be 1, 10 or some other number between 0 and 100. For dictionary compression variants that partition strings into blocks, the compression manager can evaluate the compression models for x % of the blocks in a dictionary, where x can be 1, 10 or some other number between 0 and 100. Or, the compression manager can evaluate the compression models for x % of the strings or blocks in a dictionary, so long as at least a threshold number of strings or blocks (e.g., 1000 strings, 5000 strings) is evaluated.

B. Predicting Run-Time Performance.

Fast performance for extract operations, locate operations and dictionary construction operations is desirable in a database system. In example implementations, performance depends on the dictionary compression variant that is used for a dictionary, and indirectly depends on the column data represented in the dictionary. For several reasons, these dependencies can be difficult to model.

First, the relation between performance and compression rate, even for a single compression technique, can be complicated. When aggressive compression has been used, decompression performance can depend on compression rate. For example, decompression of Re-Pair compressed data is slower if many of the rules are recursive, which is often the case for a high compression rate, but faster for simple rules. As another example, decompression of data compressed using Hu-Tucker codes or Huffman codes is slower if the code tree is unbalanced, which is often the case for a high compression rate, but faster for a balanced code tree.

Second, memory caching complicates the modeling process. If a compressed dictionary is small, it might fit into one of the processor caches, leading to faster access times. For a larger dictionary, only some parts of the compressed dictionary may fit into a processor cache, leading to significant differences in performance depending on which part is accessed. Also, using caches at different levels of a cache hierarchy will result in differences in access times and throughput. If multiple dictionaries are accessed, some compressed dictionaries may be in a cache, while other compressed dictionaries are not.

In example implementations, to predict run-time performance for the different dictionary compression variants, the compression manager measures run times for extract operations, locate operations and/or dictionary construction operations on sets of training data. Based on these measurements, the compression manager assigns representative run times for the dictionary operations for different dictionary compression variants.

For example, for each of the dictionary compression variants, the compression manager evaluates performance for each of the sets of training data. For a given dictionary compression variant, the compression manager measures the run times of training$_{ex\_rand}$ random extract operations, training$_{ex\_seq}$ sequential extract operations and training$_{loc}$ location operations for each training set. The values of training$_{ex\_rand}$, training$_{ex\_seq}$ and training$_{loc}$ depend on implementation. Example values are 10 million, 50 million and 5 million operations, respectively. Alternatively, more or fewer operations are measured. The compression manager can also measure dictionary construction times. For the given dictionary compression variant, the compression manager then calculates the average run time per random extract operation, sequential extract operation, locate operation and dictionary construction, respectively, for the sets of training data. Alternatively, the compression manager can calculate average run times for different types of data (different training sets). The compression manager can also compute different average run times for the sets of training data when interpreted as human-readable strings versus when interpreted as raw binary data. Alternatively, instead of calculating average run times, the compression manager can calculate median run times or some other representative run times per extract, locate and construction operation.

These representative run times for the different dictionary compression variants, based on training data, can be used during selection of dictionary compression variants to apply to actual column data. If a database system contains a mix of columns with different types of content, for example, the compression manager uses the representative (e.g., average) run times for all training data. Or, if a database system contains mostly columns with one type of content, the compression manager uses representative (e.g., average) run times more appropriate for that type of content.

In terms of performance, dictionary compression variants without aggressive compression tend to provide much faster run-time performance than variants that use aggressive compression. Typically, an uncompressed array variant or fixed-length array variant provides the shortest run times, with some minor differences for extract operations, locate operations and construction times. Also, performance tends to be much faster for raw binary data, compared to human-readable string data, due to the more complex comparison operations used for human-readable string data.

V. Example Selection Processes.

Using compressed dictionary sizes estimated with compression models and using predicted run-tune performance, the compression manager selects a dictionary compression variant to apply for a dictionary. The data set that is compressed corresponds to distinct string values of a column of a column-store database table. Columns may have different access patterns, and the column data for columns may differ in terms of compressibility. Also, the resources available in a database system may change over time. Each of these factors can affect the selection of a dictionary compression variant for the dictionary for a column. For example:

For columns that are accessed very frequently, the compression manager favors fast dictionary compression variants, and compression rate is given less emphasis.

For columns that are rarely accessed, the compression manager favors dictionary compression variants with higher compression rate, and run-time performance is given less emphasis.

If a column contains only few distinct values but the table (column vector) is very large, the size of the compressed dictionary is dominated by the table (column vector). The compression manager does not emphasize compression rate in this case.

For columns mainly accessed with extract operations, the compression manager favors a dictionary compression variant that supports fast extract operations.

For columns mainly accessed with locate operations, the compression manager favors a dictionary compression variant that supports fast locate operations.

For update-intensive columns, the compression manager favors a dictionary compression variant that supports fast construction. Heavily compressed dictionaries usually take longer to construct.

Small dictionaries tend to be difficult to compress, due to the overhead resulting from compression. Hence, the compression manager favors less aggressive compression even no compression) for small dictionaries.

Ideally, a dictionary compression variant provides small compressed dictionary size, fast access operations and fast construction time. In most instances, however, a single dictionary compression variant does not provide the best results among the available dictionary compression variants for all of these factors.

A. Generalized Technique for Adaptive Dictionary Compression.

Figure 7:
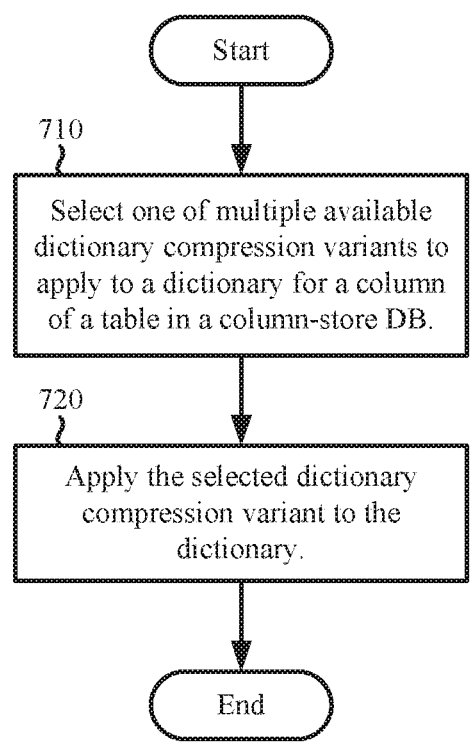
FIG. 7 is a flowchart illustrating a generalized technique for adaptive compression of dictionaries for a column-store database.

FIG. 7 shows a generalized technique (700) for adaptive compression of dictionaries for a column-store database. A compression manager such as one described with reference to FIG. 2 or another compression manager performs the technique (700).

The compression manager selects (710) one of multiple available dictionary, compression variants to apply to a dictionary for a column of a table in a column-store database. The column can be any arrangement of values for a given field, attribute or other property of records in a table. A dictionary maps distinct values among values of a column to value IDs. For domain encoding that uses the dictionary, the values of the column are replaced with corresponding value IDs, which are oriented as a column vector in the column-store database table. The column-store database can be an in-memory column-store database or other column-store database. Typically, the dictionary is a string dictionary sorted according to the distinct values for the column. Alternatively, the dictionary is another type of dictionary.

The dictionary compression variants can differ in terms of the compression technique(s) that they incorporate. For example, the multiple available dictionary compression variants can include: (1) one or more variants that use Huffman coding or Hu-Tucker coding; (2) one or more variants that use front coding; (3) one or more variants that use bit compression; (4) one or more variants that use N-gram compression (according to which N-tuples are replaced with x-bit codes, for N greater than or equal to 2); (5) one or more variants that use Re-Pair compression; (6) one or more variants that use column-wise bit compression; and/or (7) another variant.

The dictionary compression variants can also differ in terms of the data structures used or other implementation choices made for the variants. For example, the multiple available dictionary compression variants can include: (1) one or more variants that use an array of string data and an array of pointers to locations in the array of string data; (2) one or more variants that use an array of fixed-length blocks; (3) one or more variants that use data structures for front coding (e.g., if inline front coding is used, interleaving prefix lengths with suffix lengths and string suffixes; if block header-based front coding is used, using a block header that includes the prefix lengths and the suffix lengths and a block that includes the string suffixes); (4) one or more variants that use data structures for column-wise bit compression; and/or (5) another variant.

In some implementations, the selection (710) of one of the multiple available dictionary compression variants is based at least in part on user input that indicates the selected variant. In other implementations, as part of the selection (710) process, the compression manager determines which of the dictionary compression variants results in the smallest compressed dictionary size, which of the dictionary compression variants results in the shortest delays in run-time performance, or which of the dictionary compression variants results in an acceptable trade-off between compressed dictionary size and delays in run-time performance. In addition to accounting for the size of the compressed dictionary, the compressed dictionary size can be weighted to account for size of the column. The run-time performance can account for frequency of access, as controlled by a scaling parameter. Alternatively, the compression manager uses another selection strategy.

Before selecting (710) one of the dictionary compression variants, the compression manager can evaluate at least some of the available dictionary compression variants. For example, the compression manager evaluates available dictionary compression variants in terms of compressed dictionary size and run-time performance, where the selection (710) is based at least in part on results of the evaluation. The selection (710) can also be based at least in part on a tuning parameter that sets a preference between compressed dictionary size and run-time performance, where the tuning parameter is adjusted based at least in part on amount of free memory in the system for the database.

Or, as another example, the compression manager evaluates available dictionary compression variants using compression models for the respective dictionary compression variants, where the selection (710) is based at least in part on results of the evaluating. A given compression model predicts size of the compressed dictionary using at least some values of the column (that is, with sampling or without sampling). To speed up the process of predicting the compressed dictionary size for the given compression model, the compression manager can consider a sampling of the values of the column.

Or, more generally, the compression manager evaluates available dictionary compression variants using (1) characteristics of the respective dictionary compression variants, (2) characteristics of the column and (3) characteristics of the system for the database, where the selection (710) is based at least in part on results of the evaluating. The characteristics of the dictionary compression variants can include, for a given dictionary compression variant, a compression model and one or more run time values. The characteristics of the column can include an expected number of extract operations until a next merge operation, an expected number of locate operations until the next merge operation, a size of a column vector for the column, a merge frequency and values of the column. The characteristics of the system can include an amount of free physical memory and an amount of physical memory currently consumed by the database. These and other characteristics are described below with reference to FIG. 9.

The compression manager applies (720) the selected dictionary compression variant to the dictionary. The compression manager can repeat the selection (710) and application (720) of a dictionary compression variant for each of one or more other columns of the column-store database table. The compression manager can perform the technique (700) periodically for a column of the database, when a delta merge operation happens for the column, or on some other basis.

B. Example Technique for Evaluation and Selection of Variants.

Figure 8:
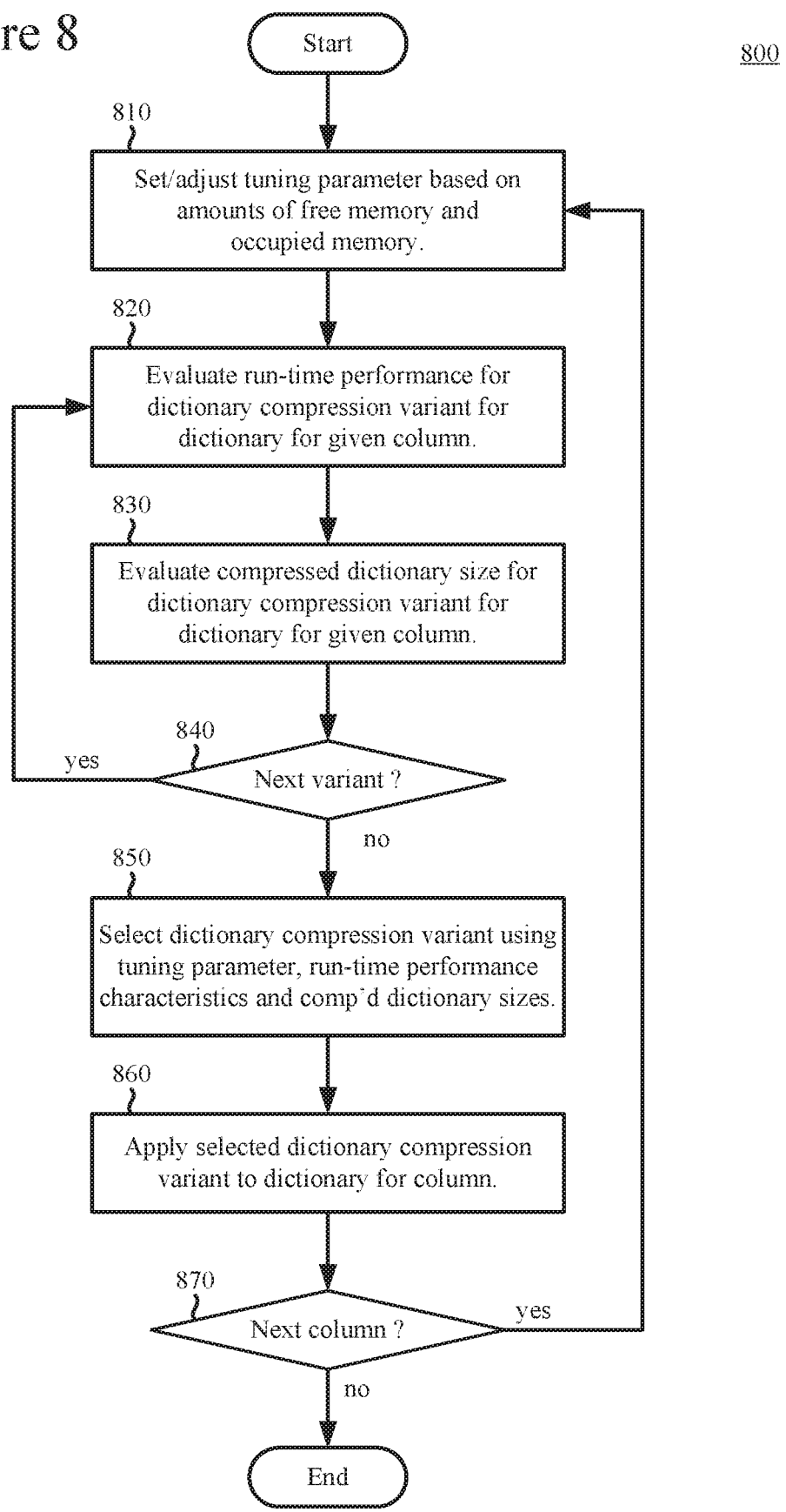
FIG. 8 is a flowchart illustrating an example technique for evaluating and selecting dictionary compression variants to apply to dictionaries for an in-memory column-store database.

FIG. 8 shows an example technique (800) for evaluating and selecting dictionary compression variants to apply to dictionaries for an in-memory column-store database, A compression manager such as one described with reference to FIG. 2 or another compression manager performs the technique (800).

To start, the compression manager sets (810) a tuning parameter based on the amount of free memory and the amount of occupied memory in the database system. The tuning parameter establishes a preference between favoring compression rate (smaller compressed dictionary size) and favoring run-time performance (faster database operations). Examples of the tuning parameter are described with reference to FIG. 9. Alternatively, the compression manager uses a different tuning parameter.

For a given dictionary compression variant, the compression manager evaluates (820) the run-time performance for the dictionary compression variant when applied to a dictionary for a given column of a table of the in-memory column-store database. For example, the compression manager determines representative (e.g., average) run tune values per operation, as explained above. The compression manager also evaluates (830) the compressed dictionary size for the dictionary compression variant when applied to the dictionary for the given column. For example, the compression manager uses a compression model appropriate for the dictionary compression variant, as explained above. Alternatively, the compression manager evaluates the run-rime performance and/or compressed dictionary size for the variant in some other way.

The compression manager checks (840) whether to continue the evaluation process with another dictionary compression variant. If so, the compression manager evaluates (820, 830) compressed dictionary size and run-time performance for the next dictionary compression variant. In this way, the compression manager evaluates some or all of the available dictionary compression variants for the dictionary for a column of the database table.

Using the tuning parameter, run-time performance characteristics determined during evaluation (820) and compressed dictionary sizes determined during evaluation (830), the compression manager selects (850) one of the dictionary compression variants. Different selection strategies are detailed below. The compression manager applies (860) the selected dictionary compression variant to the dictionary for the given column.

The compression manager checks (870) whether to continue with the next column. If so, the compression manager can adjust (810) the tuning parameter based on the amount of free memory and the amount of occupied memory in the system. In this way, the compression manager can select dictionary compression variants to apply for some or all of the columns of the in-memory column-store database table.

The compression manager can repeat the technique (800) from time-to-time. For example, the compression manager can repeat the technique (800) after a delta merge operation for a column of an in-memory column-store database, or when the amount of free memory in the system changes significantly, or periodically.

C. Example Decision Framework for Adaptive Dictionary Compression.

Figure 9:
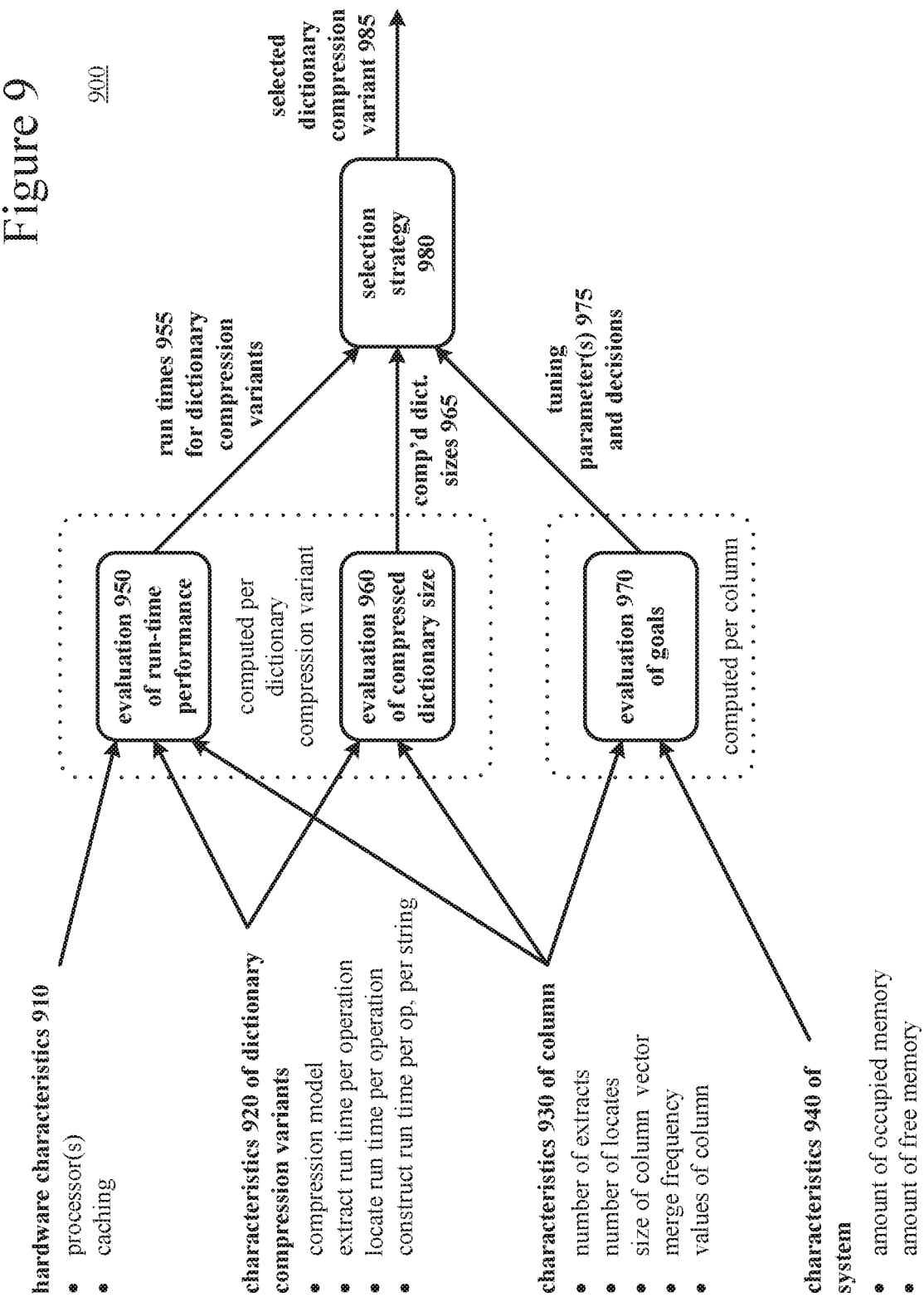
FIG. 9 is a diagram illustrating an example framework for evaluation of available dictionary compression variants as part of adaptive compression of dictionaries for an in-memory column-store database.

FIG. 9 shows a framework (900) for evaluation of available dictionary compression variants as part of adaptive compression of dictionaries for an in-memory column-store database. In the framework (900), for a column of a column-store database, a compression manager selects a dictionary compression variant from among multiple available dictionary compression variants.

The inputs for the framework (900) include hardware characteristics (910), characteristics (920) of dictionary compression variants, characteristics (930) of a column and characteristics (940) of a system for a database.

The hardware characteristics (910) include processors in the system and cache memory characteristics of the system. Alternatively, since the effects of these attributes can be complicated to model, the compression manager can ignore the hardware characteristics (910).

The characteristics (920) of dictionary compression variants include, for each dictionary compression variant that is evaluated, the compression model to use for the dictionary compression variant and run time values that have been measured experimentally for training data. The run time values include representative run times per extract operation, locate operation and dictionary construction. Since construction time depends on the number of strings in a dictionary, the construction time can be provided as a construction time per string.

The characteristics (930) of a column include the number of extract operations and number of locate operations until the next merge operation (or, access frequencies for extract operations and locate operations), as well as the merge frequency (that is, how often a new dictionary is created for the column). The number of extract operations, number of locate operations and merge frequency can be measured by maintaining counters for each column, so as to determine historically accurate values. The characteristics (930) of the column also include the values of the column (specifically, the distinct string values for the dictionary), the column type (raw binary data or human-readable string data) and size of the column vector.

The characteristics (940) of the system for the database include the amount of free memory in the system and the amount of occupied memory in the system. These indicate a level of memory pressure for the system. In some implementations, the amount of occupied memory (physical memory currently consumed by the database) and the amount of free memory (free physical memory) are reported by the system. Alternatively, the characteristics (940) of the system include information about processing capacity (as it might affect whether computationally intensive compression is used) or other attributes of the system.

Using the characteristics (920) of the dictionary compression variants and the characteristics (930) of a given column (and optionally using the hardware characteristics (910)), the compression manager performs evaluation (950) of run-time performance for each of the dictionary compression variants. This produces run times (955) for the respective dictionary compression variants, which indicate amounts of run time spent for the respective variants. The run times (955) for a given dictionary compression variant indicate time the database is expected to spend using the dictionary for access operations, update operations and/or construction operations.

For example, if the compression manager has representative (e.g., average) run times per extract operation ($rt\_op_{ex}$), locate operation ($rt\_op_{lo}$) and dictionary construction ($rt\_op_{co}$, per string), from measurements on training data, the compression manager can compute an overall run time for the dictionary compression variant as follows:

$$rt\_agg_{ex} = num_{ex} \times rt\_op_{ex},$$

$$rt\_agg_{lo} = num_{lo} \times rt\_op_{lo},$$

$$rt\_agg_{co} = num_{merges} \times num_{strings} \times rt\_op_{co}, \text{ and}$$

$$rt\_agg_{overall} = rt\_agg_{ex} + rt\_agg_{lo} + rt\_agg_{co},$$

where the number of extract operations ($num_{ex}$), number of locate operations ($num_{lo}$), and number of merge operations ($num_{merges}$) depend on values in the column characteristics (930), and where $num_{strings}$ represents the number of strings in the dictionary. Although the run times also depend on the hardware characteristics (910), the influence of the hardware characteristics (910) on the run times can difficult to model and, hence, is ignored.

Using the characteristics (920) of the dictionary compression variants and the characteristics (930) of a given column, the compression manager also performs evaluation (960) of compressed dictionary size for each of the dictionary compression variants. This produces compressed dictionary sizes (965) for the respective dictionary compression variants. The compressed dictionary size (965) for a given dictionary compression variant indicates the final memory size of the compressed dictionary, filled with the content of the raven column. The compressed dictionary size can be predicted using the appropriate compression model for the dictionary compression variant, considering the content of the given column. The compressed dictionary size can later be weighted by the size of the column vector.

Using the characteristics (930) of a given column and the characteristics (940) of the system, the compression manager performs evaluation (970) of goals for the column. This produces one or more tuning parameters (975) and decisions that indicate whether dictionary compression for the column should favor fast access, small compressed dictionary size or fast merges. Some of the goals depend on the column access patterns for the given column. More specifically:

- The compression manager can use the numbers of extract and locate operations until next merge operation to determine whether the column is frequently accessed. The compression manager tends to use faster dictionary compression variants for frequently accessed columns, so as to maintain reasonable database performance.
- The compression manager can use the ratio of number dictionary entries (distinct values) to size of column vector (number of table rows) to determine if the compressed dictionary size is dominated by the column vector size. If the dictionary is small compared to the column vector size, compressing the dictionary will not have a great effect on overall database size, and the compression manager favors a faster dictionary compression variant. On the other hand, if the dictionary is large compared to the column vector size, the compression manager favors a dictionary compression variant with more aggressive compression.
- If the system includes an abundance of free memory, the compression manager puts less emphasis on compression rate.

When setting the tuning parameters (975) and decisions, the compression manager considers a global goal for the database system. Subject to the global goal, the compression manager also considers local goals for the columns of a column-store data base table, depending on compressibility of entries of a dictionary, column access patterns, column update patterns, etc.

Using the run times (955) and compressed dictionary sizes (965) for the respective dictionary compression variants, and using the tuning parameter(s) (975) and decisions, the compression manager executes a selection strategy (980). This results in selection of a dictionary compression variant (985) for the given column. Example selection strategies are detailed below.

D. Determining the Global Goal.

When a dictionary is created (initially, or during a dictionary merge operation), a compression manager selects a dictionary compression variant based on characteristics of dictionary compression variants, characteristics of a column and characteristics of the system. For a set of database columns C and set of dictionary compression variants D, the compression manager attempts to identify a mapping f: C→D, that satisfies the following criteria or, if all criteria cannot be concurrently satisfied, provides an acceptable solution.

The compression manager seeks to minimize the total run time for the dictionaries:

$$\min \sum_{c \in C} \text{rt\_agg}_{overall}(f(c)).$$

If run time cannot be minimized (due to other criteria), more frequently accessed columns are assigned faster dictionary compression variants (possibly resulting in larger compressed dictionary sizes while less frequently accessed columns are assigned slower dictionary compression variants (possibly resulting in smaller compressed dictionary size).

The compression manager assigns dictionary compression variants such that column data for all columns of a column-store database table fits in main memory. If this is not possible, the compression manager assigns dictionary compression variants such that column data for as many columns as possible, or as many frequently accessed columns as possible, remain in main memory. Stated differently, the compression manager seeks to reduce dictionary accesses for columns that are unloaded from main memory. If the amount of available memory space is mem, the compression manager seeks to assign dictionary compression variants such that $$\sum_{c \in C} \text{comp\_size}(f(c)) < mem.$$

If there is not enough memory available to fit compressed dictionaries for all columns, even when compression rate is highest, the compression manager unloads the compressed dictionaries for the least frequently accessed columns.

The compression manager assigns dictionary compression variants such that access operations until the next merge operation can be performed. In other words, the total run time for access operations is less than the merge interval (merge_interval):

$$\sum_{c \in C} \text{rt\_agg}_{overall}(f(c)) \le \text{merge\_interval}$$

In practice, in many cases, the compression manager cannot concurrently satisfy all of these criteria. The process of selecting dictionary compression variants is complicated (NP-hard) and, hence, difficult to solve efficiently. Also, it might not be practical to merge (reconstruct) all dictionaries at the same time. Further, in some cases, compressed dictionary sizes and access statistics are not available for all dictionary compression variants or columns.

In example implementations, a compression manager uses a global tuning parameter Δc that defines a trade-off between run time and compressed dictionary size for an entire column-store database. The trade-off depends on the amount of free space in memory (e.g., for main memory), in keeping with the goal of using dictionary compression so that compressed dictionaries will fit in main memory. If enough free memory is available, the compression manager should be allowed to choose faster dictionary compression variants with larger compressed dictionary size, and the tuning parameter Δc is set accordingly.

The compression manager can set or adjust the tuning parameter Δc before selecting the dictionary compression variant to use for a dictionary of a column. Then, the compression manager considers the tuning parameter during the selection process. For example, the compression manager selects the fastest dictionary compression variant that has compressed dictionary size less than or equal to the smallest compressed dictionary size+Δc percent. A low value of Δc tends to result in selection of dictionary compression variants with higher compression rates (smaller compressed dictionary size), and a high value of Δc tends to result in selection of dictionary compression variants with faster run-time performance (but larger compressed dictionary size).

Initially, the compression manager assigns a default value to the tuning parameter Δc. For the initial columns loaded into memory, the compression manager can select dictionary compression variants that provide moderate run-time performance and moderate compressed dictionary size (e.g., a front coding variant without compression of suffix strings). Then, as more compressed dictionaries are loaded into main memory, the compression manager can adjust the global tuning parameter Δc depending on the amount of free space in memory. If enough memory is available, the compression manager can increase the global tuning parameter Δc, such that faster dictionary compression variants are selected during subsequent dictionary constructions (e.g., after delta merge operations). Or, if the amount of free memory is below a threshold amount (e.g., x % of available memory, where x can be 10, 20 or some other number), the compression manager can decrease the global tuning parameter Δc, such that dictionary compression variants with smaller compressed dictionary size are selected, and unloading of compressed dictionaries from memory is avoided, if possible.

Figure 10:
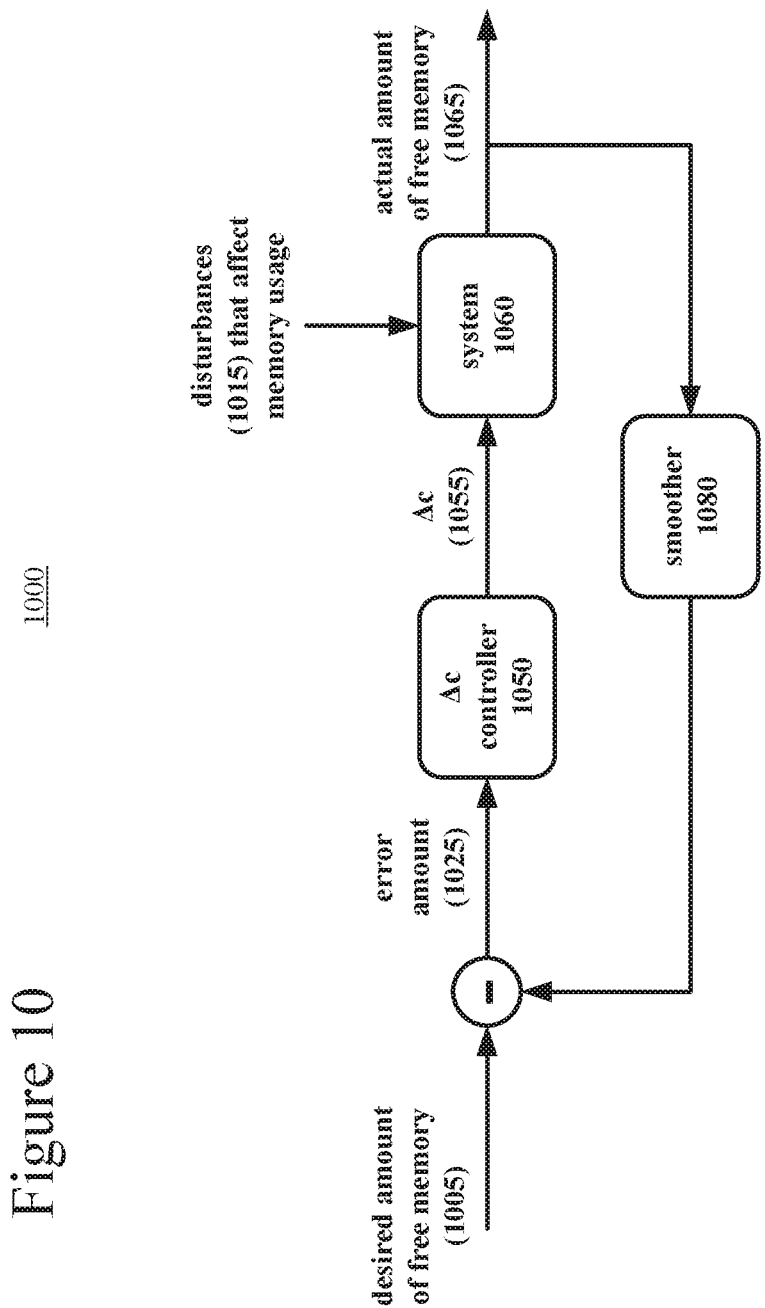
FIG. 10 is a diagram illustrating an example approach to setting a tuning parameter for adaptive compression of dictionaries for an in-memory column-store database.

FIG. 10 shows an example approach (1000) to setting a global tuning parameter Δc for adaptive compression of dictionaries for an in-memory column-store database. The approach (1000) can be implemented as part of a compression manager.

The approach uses a closed-loop feedback control system. The desired amount of free memory (1005) is provided as input to the control system. The measured output is the actual amount of free memory (1065) that is currently available. The system determines the difference, or error amount (1025), between the desired amount of free memory (1005) and actual amount of free memory (1065). Using the error amount (1025), a Δc controller (1050) adjusts the value of the global tuning parameter Δc (1055). For example, the Δc controller (1050) increases the global tuning parameter Δc if the error amount (1025) indicates enough free memory is available (e.g., error amount is greater than a first threshold amount), decreases the global tuning parameter Δc if not enough free memory is available (e.g., the error amount is less than a second threshold amount), and otherwise leaves the global tuning parameter Δc unchanged.

The system (1060) uses the global tuning parameter Δc when selecting a dictionary compression variant for each of one or more columns. The compressed dictionary data is loaded into memory, which affects the amount of free memory. The system (1060) also tracks disturbances that affect the amount of free memory. The system (1060) measures and outputs the actual amount of free memory (1065).

Using this approach (1000), the global tuning parameter Δc may fluctuate significantly. When a large dictionary is unloaded from memory, the Δc controller will increase the tuning parameter Δc. Later, after delta merge operations, faster dictionary compression variants may be selected for dictionaries of columns, resulting in dictionaries with larger compressed dictionary size. When the new compressed dictionaries are loaded into memory, the amount of free memory decreases, which may force other dictionaries to be unloaded from memory. To mitigate this "thrashing" effect, a smoother (1080) can smooth the series of measured actual amounts of free memory (1065). One possible smoothing function uses a weighted average over the last n measurements of actual free memory $afm_1, \ldots, afm_n$:

$$afm_{new} = \frac{\sum_{i=1}^{n} w_i \times afm_i}{n},$$

where the weights $w_1, \ldots, w_n$ control the smoothing of the curve for actual memory measurements, and the smoothed value ($afm_{new}$) is used to compute the error amount (1025). If older measurements are weighted more, the current amount of free memory (1065) has less influence on the curve and, hence, rapid changes are suppressed.

Another smoothing function uses a simplified average of measured actual amounts of free memory (1065), considering the current amount ($afm_{current}$) and an aggregate ($afm_{old}$) of previously measured amounts of actual free memory.

$$afm_{new} = \alpha_s \times afm_{current} + (1-\alpha_s) \times afm_{old}, \text{ for } 0 \leq \alpha_s \leq 1.$$

With the parameter $\alpha_s$, the smoother (1080) controls the relative weight of the current amount ($afm_{current}$). If $\alpha_s=1$, the aggregate of previous values is not considered. If $\alpha_s<1$, all of the previous values have an influence on the smoothed amount ($afm_{new}$). For example, if $\alpha_s=\frac{1}{2}$, the smoothed amount ($afm_{new}$) is a weighted sum of the measurements $afm_1, \ldots, afm_n$, where $afm_1 = afm_{current}$:

$$afm_{new} = 1/2 \times afm_1 + 1/4 \times afm_2 + \ldots + \frac{1}{2^{n-2}} \times afm_{n-2} + \frac{1}{2^{n-1}} \times afm_{n-1} + \frac{1}{2^{n-1}} \times afm_n.$$

In this smoothing function, since the sequence starts with two equally weighted values, the first two measurements $afm_{n-1}$ and $afm_n$ have the same weight.

Alternatively, the smoother (1080) uses another smoothing function.

E. Example Selection Strategies.

The compression manager can follow any of various selection strategies when selecting a dictionary compression variant. A selection strategy uses results of evaluation of run-time performance and/or evaluation of compressed dictionary size. A selection strategy can also use a global tuning parameter.

1. Smallest Compressed Dictionary Size.

The compression manager can identify the dictionary compression variant that results in smallest compressed dictionary size for a column. Given the data of a column cot, the compression manager can determine compression rate (compressed dictionary size) using compression models for different dictionary compression variants. comp_size(dcv, col) represents the predicted compressed dictionary size when the distinct values for column col are compressed using dictionary compression variant dcv. From the set of all of the dictionary compression variants DCV, the compression manager can choose the dictionary compression variant $dcv_{smallest}(col)$ that has the smallest size:

$$dcv_{smallest}(col) = \underset{dcv \in DCV}{\operatorname{argmin}} comp\_size(dcv, col).$$

The comp_size(dcv,col) function can be based on compressed dictionary size alone. Or, the comp_size(dcv,col) function can be based on compressed dictionary size and column vector size, as explained below.

2. Fastest Run-Time Performance.

Or, the compression manager can identify the dictionary compression variant that results in fastest run-time performance for a column. From measurements on training data, the compression manager has the representative (e.g., average) run time per extract operation ($rt\_op_{ex}$), the representative (e.g., average) run time per locate operation ($rt\_op_{lo}$) and the representative (e.g., average) run time per construction operation ($r\_op_{co}$, per string) for a particular dictionary compression variant dcv. For a column col, the compression manager also has values for access frequency for extract operations ($f_{ex}$), access frequency for locate operations ($f_{lo}$) and the number of strings ($num_{strings}$) in the dictionary for the column. The value $rt\_agg\_nm_{overall}$(dcv, col) represents the overall run-time performance, until a next merge operation, when the distinct values for column col are compressed using dictionary compression variant dcv:

$$rt\_agg\_nm_{overall}(dcv,col) = f_{ex} \times rt\_op_{ex} + f_{lo} \times rt\_op_{lo} + num_{strings} \times rt\_op_{co}.$$

From the set of all of the dictionary compression variants DCV, the compression manager can choose the dictionary compression variant $dcv_{fastest}(col)$ that is fastest.

$$dcv_{fastest}(col) = \underset{dcv \in DCV}{\operatorname{argmin}} rt\_agg\_nm_{overall}(dcv, col).$$

3. Trade-Off Strategies, Considering Global Goal

Following a "smallest compressed dictionary size" strategy can result in the selection of dictionary compression variants that have slow run-time performance. Following a "fastest performance" strategy can result in the selection of dictionary compression variants that consume too much memory. Instead of these extremes, the compression manager can identify a dictionary compression variant that balances compressed dictionary size and run-time performance.

For example, among a subset of dictionary compression variants that yield acceptable compressed dictionary size, the compression manager selects the fastest dictionary compression variant. Given a column col and tuning parameter Δc, the compression manager selects the fastest dictionary compression variant from the set of all dictionary compression variants DCV' whose size is at most Δc more than the smallest compressed dictionary size. The smallest compressed dictionary size is $$comp\_size_{smallest}(col) = \underset{dcv \in DCV}{\min} comp\_size(dcv, col).$$

The subset of dictionary compression variants that yield acceptable compressed dictionary size is:

$$DCV' = \{dcv\_i \in DCV | comp\_size(dcv\_i,col) \leq (1+\Delta c) \times comp\_size_{smallest}(col)\}$$

The compression manager identifies the fastest dictionary compression variant in the subset:

$$dcv_{trade\text{-}off}(col) = \underset{dcv \in DCV'}{\operatorname{argmin}} rt\_agg\_nm_{overall}(dcv, col).$$

Alternatively, among a subset of dictionary compression variants that yield acceptable run-time performance, the compression manager selects the dictionary compression variant with smallest compressed dictionary size.

4. Local Goals in Selection Strategies.

By using the global tuning parameter Δc, the compression manager can select a dictionary compression variant appropriate for a given column, considering an overall preference between compressed dictionary size and run-time performance. The compression manager can also consider special attributes of column data for the column, such as its access frequency and column vector size, as local goals. For example, the compression manager can select dictionary compression variants that compress small dictionaries (compared to column vector size) less aggressively than large compressed dictionaries. Or, the compression manager can select dictionary compression variants that compress frequency accessed columns less aggressively than rarely accessed columns.

To quantify these local goals, the compression manager can compare compressed dictionary sizes and column vector sizes for all columns, or compare access frequencies for all columns, in order to rank the columns according to these attributes. Or, to avoid checking this information for all columns, the compression manager can adapt measures used in the trade-off strategy described above, in order to account for local goals.

For example, to account for relative size of the compressed dictionary compared to the column vector size for a column (number of values in the column), the compression manager can adapt how compressed dictionary size is quantified. In particular, the compression manager can add a factor that depends on size of the column vector for a column.

$$comp\_size'(dcv,col) = comp\_size(dcv,col) + column\_vector\_size(col).$$

The compression manager then uses the weighted compressed dictionary size instead of the simple compressed dictionary size in one of the selection strategies described above (smallest compressed dictionary size strategy or trade-off strategy). Or, the compression manager can adjust the global tuning parameter Δc depending on the weighted compressed dictionary size. If the compressed dictionary size is small compared to the table size (as quantified by the column vector size), the compressed dictionary size is dominated by the table size. In this situation, variations in compression rate for different dictionary compression variants will have only a small impact on overall memory consumption. The compression manager can relax the global tuning parameter (increase Δc), resulting in selection of faster dictionary compression variants for these dictionaries with relatively small compressed dictionary size.

As another example, to account for access frequency for a column, the compression manager can adapt how run-time performance is quantified. In particular, the compression manager can weight the overall run time value for a column depending on the time that will elapse between merge operations (quantified as lifetime(dcv, col)).

$$\text{rel\_rt}_{overall}(dcv, col) = \frac{\text{rt\_agg\_nm}_{overall}(dcv, col)}{lifetime(dcv, col)}.$$

The compression manager then uses the relative run time instead of the absolute run time in one of the selection strategies described above (fastest run-time performance strategy or trade-off strategy). Or, the compression manager can adjust the global tuning parameter $\Delta c$ depending on relative run-time performance. The compression manager can define a frequently accessed column as one that consumes a threshold percentage of the available run time (e.g., 20%, 30%, etc.). For a frequently accessed column, the compression manager can relax the global tuning parameter (increase $\Delta c$), tending to cause selection of a faster dictionary compression variant for the dictionary for the frequently accessed column.

In one approach (constant approach) to adjusting the global tuning parameter $\Delta c$ depending on relative run-time performance, the compression manager identifies a subset DCV" of dictionary compression variants that yield acceptable compressed dictionary size, considering (1) the relative run-time performance (rel_rt$_{smallest}$) for the dictionary compression variant dcv$_{smallest}$(col) with the smallest compressed dictionary size, where rel_rt$_{smallest}$=rel_rt$_{overall}$(dcv$_{smallest}$col)), and (2) the smallest compressed dictionary size (comp_size$_{smallest}$(col)) for the column:

rel_adj_constant=1+rel_rt$_{smallest}$×$\alpha_r$, comp_size$_{adj\_constant}$(col)=(1+$\Delta c$×rel_adj_constant)× comp_size$_{smallest}$(col), and DCV"={dcv_i∈DCV|comp_size(dcv_i,col)≤ comp_size$_{adj\_constant}$(col)}, where $\alpha_r$ represents a scaling factor that controls deviation from the default, non-adjusted value for the global tuning parameter $\Delta c$. If the scaling factor is zero ($\alpha_r$=0), the relative run-time performance for the dictionary compression variant dcv$_{smallest}$(col) has no effect. The compression manager identifies the fastest dictionary compression variant within the subset DCV":

$$dcv_{trade\text{-}off\_freq}(col) = \underset{dcv \in DCV''}{\operatorname{argmin}} \text{rt\_agg\_nm}_{overall}(dcv, col).$$

In another approach (negative slope approach) to adjusting the global tuning parameter $\Delta c$ depending on relative run-time performance, the compression manager identifies a subset DCV''' of dictionary compression variants that yield acceptable compressed dictionary size, considering (1) the relative run-time performance for the dictionary compression variant with the smallest compressed dictionary size for a column (rel_rt$_{smallest}$), and (2) the relative run-time performance (rel_rt$_{dcv\_i}$) for a dictionary compression variant being evaluated for a column, where rel_rt$_{dcv\_i}$=rel_rt$_{overall}$(dcv_i,col):

rel_adj_linear=−$\alpha_r$×rel_rt$_{smallest}$×rel_rt$_{dcv\_i}$+$\beta$, comp_size$_{adj\_linear}$(col)=(1+$\Delta c$)×comp_size$_{smallest}$(col)+rel_adj_linear, and DCV'''={dcv_i∈DCV|comp_size(dcv_i,col) ≤comp_size$_{adj\_linear}$(col)}, where $\beta$ is a constant value equal to $\alpha_r$×(rel_rt$_{smallest}$)$^2$. Given the definition for the constant $\beta$, rel_adj_linear tends to scale up the tuning parameter $\Delta c$ when rel<rt$_{dcv\_i}$<rel_rt$_{smallest}$, and scale down the tuning parameter $\Delta c$ when rel_rt$_{dcv\_i}$>rel_rt$_{smallest}$. When rel_rt$_{dcv\_i}$=rel_rt$_{smallest}$, the tuning parameter $\Delta c$ is unchanged. In the negative slope approach, the scaling parameter $\alpha_r$ controls the negative slope of a line that represents deviation from the default, non-adjusted value for the global tuning parameter $\Delta c$, for different values of rel_rt$_{dcv\_i}$. The compression manager identifies the fastest dictionary compression variant within the subset DCV''':

$$dcv_{trade\text{-}off\_freq}(col) = \underset{dcv \in DCV'''}{\operatorname{argmin}} \text{rt\_agg\_nm}_{overall}(dcv, col).$$

Alternatively, the compression manager uses another approach to adjusting the global tuning parameter $\Delta c$ depending on relative run-time performance. For example, the influence of rel_rt$_{smallest}$ can be quadratic instead linear, in which case the effect of relative run-time performance would be reduced for less frequently accessed columns.

The compression manager can set the scaling factor $\alpha_r$ experimentally, checking different values for $\alpha_r$ to find a good trade-off for dictionaries for frequently accessed columns. Common values for $\alpha_r$ are 0.2, 0.5, and 1.0. Or, the compression manager can set the scaling factor subject to one or more additional constraints. For example, for the negative slope approach, the compression manager can check if the run time of the dictionary compression variant with the smallest compressed dictionary size is greater than or equal to 100% of the available time until the next merge operation. If so, the compression manager selects the fastest dictionary compression variant dcv$_{fastest}$(col) (or, simply, dcv_f). Then, given dcv_f, the compression manager sets the scaling factor $\alpha_r$ by solving the following equation for $\alpha_r$:

comp_size(dcv_f,col)=(1+$\Delta c$×(1−$\alpha_r$×rel_rt$_{dcv\_f}$+$\beta$))× comp_size$_{smallest}$(col).

VII. Alternatives.

The compression manager can completely rebuild a dictionary after a delta merge operation (in which updates to a column are merged with the previous version of the column). If a dictionary compression variant uses aggressive compression (e.g., Re-Pair compression), the construction process can be computationally intensive. In some database systems, delta merge operations for a column can happen hundreds or even thousands of times per week. To support such workloads, a delta merge (and dictionary construction) should be efficient.

Some compression techniques allow use of an old compressed dictionary, with incremental addition of new strings to the dictionary. For example, this is permitted for N-gram compression, which includes code values for all possible characters. For front coding and column-wise bit compression, however, insertion of a new string into a block perturbs the compressed values for that block and later blocks of the dictionary, causing re-organization of the blocks, etc. For Hu-Tucker coding and bit compression, the new strings may include new characters not represented in code values, which will cause changes to many of the code values. Also, for any of the compression techniques, adding new strings to a dictionary can change the compression efficiency of the compression technique, which presumes certain probability distributions and/or patterns among values in the dictionary.

Instead of reconstructing a dictionary from scratch whenever a delta merge happens, the compression manager can selectively reused dictionary data. For example, the compression manager can reconstruct the dictionary front scratch if many new strings have been added. On the other hand, if new strings are added only at the end of a dictionary compressed using front coding or column-wise bit compression, the compression manager can reorganize the existing compressed dictionary, adjusting or adding one or more blocks at the end of the dictionary. This situation may happen, for example, when larger numbers are added to a dictionary that includes ascending numbers. Or, as another example, if a dictionary has been reorganized (but not reconstructed from scratch) for several delta merge operations, the compression manager can reconstruct the dictionary to take account of cumulative changes in probability distributions or patterns in the data values.

By default, a compression manager analyzes an entire set of values of a dictionary when determining code values. For some compression techniques (e.g., Re-Pair compression, N-gram compression), however, the compression manager can analyze a subset of the values of the dictionary. This reduces construction time, and construction can occur without buffering all of the values for the dictionary. The compression manager determines how many of the values to analyze, which trades off compression rate (highest if all values analyzed) and computational efficiency of the construction process (highest if few values analyzed).

The properties and access patterns of a column may change over time. In particular, access statistics are sparse at startup, and may become more accurate as more queries are processed for the database. To account for changes in access statistics for a column, the compression manager can periodically reconstruct a dictionary for the column. On the other hand, changing dictionary compression variants too often can diminish overall database performance due to the computational cost of reconstructing dictionaries. In one approach, the compression manager selects a dictionary compression variant once per delta merge. This limits how often dictionaries are reconstructed, but does not account for changes in access statistics. In another approach, the compression manager periodically repeats the process of selecting a dictionary compression variant for a column. In this way, the compression manager can account for changes in access statistics. By controlling how often the selection process is repeated, the compression manager can limit the computational cost of the process. Also, the compression manager can schedule the selection process during times when the system is not busy.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media storing computer-executable instructions for causing a computing system, when programmed thereby, to perform operations comprising:
    evaluating at least some of multiple available compression variants to apply to a dictionary for a column of a table in a column-store database, wherein the dictionary maps distinct values among values of the column to value identifiers, and wherein the evaluating uses compression models for the respective at least some of the multiple available compression variants, a given compression model of the compression models estimating compressed dictionary size of the dictionary for a given compression variant of the multiple available compression variants without applying the given compression variant to the dictionary;
    selecting, based at least in part on results of the evaluating, one of the multiple available compression variants to apply to the dictionary; and
    applying the selected compression variant to the dictionary, thereby reducing the compressed dictionary size of the dictionary, including, for each of at least one of the distinct values of the dictionary, replacing at least part of the distinct value with one or more codes that represent the replaced at least part of the distinct value, the one or more codes being shorter than the replaced at least part of the distinct value.

2. The one or more computer-readable media of claim 1, wherein, for domain encoding that uses the dictionary, the values of the column are replaced with corresponding value identifiers, the corresponding value identifiers being oriented as a column vector, and wherein the column-store database is an in-memory column-store database.

3. The one or more computer-readable media of claim 1, wherein the multiple available compression variants include:
    a first compression variant that uses Huffman coding or Hu-Tucker coding in which the one or more codes include one or more Huffman codes;
    a second compression variant that uses front coding in which the one or more codes include one or more prefix lengths;
    a third compression variant that uses bit compression in which the one or more codes include one or more x-bit codes each representing a single character;
    a fourth compression variant that uses N-gram compression according to which N-tuples are replaced with x-bit codes, for N greater than or equal to 2, as the one or more codes, each of the one or more codes representing N characters;
    a fifth compression variant that uses Re-Pair compression in which the one or more codes include one or more x-bit codes each representing a combination of characters; and/or
    a sixth compression variant that uses column-wise bit compression in which the one or more codes include one or more x-bit codes each representing a single character of a column.

4. The one or more computer-readable media of claim 1, wherein the multiple available compression variants include:
    a first compression variant that uses an array of string data and an array of pointers to locations in the array of string data, wherein the string data is compressed using one of Hu-Tucker coding, bit compression, N-gram compression or Re-Pair compression;
    a second compression variant that uses an array of fixed-length blocks;
    a third compression variant that uses one or more data structures for front coding; and/or
    a fourth compression variant that uses one or more data structures for bit-wise column compression.

5. The one or more computer-readable media of claim 1, wherein the evaluating accounts for the compressed dictionary size and run-time performance, the run-time performance accounting for frequency of access of the column.

6. The one or more computer-readable media of claim 5, wherein the selecting is also based at least in part on a tuning parameter that sets a preference between the compressed dictionary size and the run-time performance.

7. The one or more computer-readable media of claim 5, wherein the frequency of access of the column quantifies an expected number of extract operations from the dictionary and/or an expected number of locate operations from the dictionary, and wherein the run-time performance also accounts for frequency of construction or updating of the dictionary.

8. The one or more computer-readable media of claim 1, wherein the given compression model estimates the compressed dictionary size using only a subset of the values of the column.

9. The one or more computer-readable media of claim 1, wherein the evaluating uses one or more of:
characteristics of the respective compression variants, including, for the given compression variant, the given compression model and one or more run time values;
characteristics of the column, including an expected number of extract operations until a next merge operation, an expected number of locate operations until the next merge operation, a size of a column vector for the column, a merge frequency, and the values of the column; and
characteristics of the computing system for the database, including an amount of free physical memory and an amount of physical memory currently consumed by the database.

10. The one or more computer-readable media of claim 1, wherein the selecting is also based at least in part on user input that indicates the selected compression variant.

11. In a computing system that implements a compression manager, a method comprising:
with the computing system, evaluating at least some of multiple available compression variants to apply to a dictionary for a column of a table in a column-store database, wherein the evaluating includes estimating compressed dictionary size of the dictionary according to a compression model for a given compression variant of the multiple available compression variants without applying the given compression variant to the dictionary, and wherein the dictionary maps distinct values among values of the column to value identifiers;
with the computing system, selecting, based at least in part on results of the evaluating, one of the multiple available compression variants to apply to the dictionary; and
with the computing system, applying the selected compression variant to the dictionary, thereby reducing the compressed dictionary size of the dictionary, including, for each of at least one of the distinct values of the dictionary, replacing at least part of the distinct value with one or more codes that represent the replaced at least part of the distinct value, the one or more codes being shorter than the replaced at least part of the distinct value.

12. The method of claim 11, wherein the estimating the compressed dictionary size of the dictionary uses only a subset of the values of the column.

13. The method of claim 11, wherein the multiple available compression variants include:
a first compression variant that uses an array of string data and an array of pointers to locations in the array of string data, wherein the string data is compressed using one of Hu-Tucker coding, bit compression, N-gram compression or Re-Pair compression;
a second compression variant that uses an array of fixed-length blocks;
a third compression variant that uses one or more data structures for front coding; and/or
a fourth compression variant that uses one or more data structures for bit-wise column compression.

14. The method of claim 11, wherein the evaluating accounts for the compressed dictionary size and run-time performance, the run-time performance accounting for frequency of access of the column.

15. The method of claim 11, wherein the evaluating includes:
determining which of the multiple available compression variants results in a smallest value for the compressed dictionary size;
determining which of the multiple available compression variants results in a shortest delay in run-time performance; or
determining which of the multiple available compression variants results in an acceptable trade-off between the compressed dictionary size and delay in run-time performance.

16. A computing system comprising:
memory configured to store one or more tables for an in-memory column-store database; and
one or more processors configured to execute instructions for a compression manager, wherein at least one of the one or more processors is selected from the group consisting of central processing unit, graphics processing unit, and application-specific integrated circuit, the compression manager being adapted to compress at least some columns of the one or more tables using domain encoding, and wherein the compression manager is further adapted to:
evaluate multiple available compression variants for a dictionary for a given column of the at least some columns, the compression manager being adapted to use compression models for the respective compression variants, a given compression model of the compression models estimating compressed dictionary size of the dictionary for a given compression variant of the multiple available compression variants without applying the given compression variant to the dictionary, wherein the dictionary maps distinct values among values of the given column to value identifiers;
select one of the multiple available compression variants to apply to the dictionary for the given column; and
apply the selected compression variant to the dictionary, thereby reducing the compressed dictionary size of the dictionary, including, for each of at least one of the distinct values of the dictionary, replacing at least part of the distinct value with one or more codes that represent the replaced at least part of the distinct value, the one or more codes being shorter than the replaced at least part of the distinct value.

17. The computing system of claim 16 wherein, to evaluate the multiple available compression variants, the compression manager is further configured to:
determine which of the multiple available compression variants results in a smallest value for the compressed dictionary size;

determine which of the multiple available compression variants results in a shortest delay in run-time performance; or determine which of the multiple available compression variants results in an acceptable trade-off between the compressed dictionary size and delay in run-time performance.

18. The computing system of claim 16, wherein the multiple available compression variants include:

a first compression variant that uses an array of string data and an array of pointers to locations in the array of string data, wherein the string data is compressed using one of Hu-Tucker coding, bit compression, N-gram compression or Re-Pair compression;

a second compression variant that uses an array of fixed-length blocks;

a third compression variant that uses one or more data structures for front coding; and/or a fourth compression variant that uses one or more data structures for bit-wise column compression.

19. The computing system of claim 16, wherein a tuning parameter sets a preference between the compressed dictionary size and run-time performance.

20. The computing system of claim 16, wherein, to evaluate the multiple available compression variants, the compression manager is further configured to evaluate at least some of the multiple available compression variants using characteristics of the respective compression variants, characteristics of the given column, and/or characteristics of the computing system.

* * * * *